(12) United States Patent
Rakow et al.

(10) Patent No.: US 7,762,142 B2
(45) Date of Patent: Jul. 27, 2010

(54) INTEGRATED FASTENER-SENSOR ARRANGEMENT

(75) Inventors: Alexi Rakow, Mountain View, CA (US); Fu-Kuo Chang, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 110 days.

(21) Appl. No.: 12/205,534

(22) Filed: Sep. 5, 2008

(65) Prior Publication Data
US 2009/0071078 A1  Mar. 19, 2009

Related U.S. Application Data

(60) Provisional application No. 60/967,774, filed on Sep. 7, 2007.

(51) Int. Cl.
*F16B 31/02* (2006.01)
(52) U.S. Cl. .......................... 73/761; 324/242
(58) Field of Classification Search ............. 73/761; 324/242
See application file for complete search history.

(56) References Cited

U.S. PATENT DOCUMENTS

| | | | | |
|---|---|---|---|---|
| 4,808,927 A | * | 2/1989 | Cecco et al. | 324/220 |
| 4,849,693 A | * | 7/1989 | Prince et al. | 324/225 |
| 5,510,709 A | | 4/1996 | Hurley et al. | |

OTHER PUBLICATIONS

A.E. Crouch and G.L. Burkhardt, "*Conformable Eddy Current Array for Mapping External Pipeline Corrosion*," Proceedings of IPC'02: 4th Int'l Pipeline Conf., IPC02-27147, Sep. 29-Oct. 3, 2002, Alberta, Canada, pp. 1-7.

J.B. Ihn and F.K. Chang, "*Detection and monitoring of hidden fatigue crack growth using a built-in piezoelectric sensor/actuator network: I. Diagnostics*," Smart Materials and Structures 13, pp. 609-620 (2004).

A.Rakow and F.K. Chang, "*A Structural Health Monitoring Fastener for Tracking Fatigue Crack Growth in Bolted Metallic Joints: I. Sensor Design and Integration*," Structural Health Monitoring, An International Journal, pp. 1-13.

C. Boller, "*Ways and Options for Aircraft Structural Health Management*," Smart Materials and Structures 10, pp. 432-440 (2001).

(Continued)

*Primary Examiner*—Jewel Thompson
(74) *Attorney, Agent, or Firm*—Crawford Maunu PLLC

(57) ABSTRACT

Characteristics of a multi-layer structure are detected, such as for detecting mechanical and/or corrosive damage of the multi-layer structure. In an example embodiment, an integrated in-situ sensor device senses characteristics of a multi-layer structure during operation thereof. The device includes a mechanical coupler and a sensor circuit. The mechanical coupler couples layers of the multi-layer structure together via an opening traversing the multi-layer structure. The sensor circuit inserts into the opening with the mechanical coupler, and induces an electrical response in a portion of the multi-layer structure adjacent the opening. This induced electrical response is indicative of characteristics of the multi-layer structure, and is sensed to provide a signal characterizing characteristics of the multi-layer structure.

35 Claims, 33 Drawing Sheets

Cross-section of a wing attachment fitting.

OTHER PUBLICATIONS

G.S. Campbell and R. Lahey, "*A survey of serious aircraft accidents involving fatigue fracture*," Int. J. Fatigue, vol. 6, No. 1 (Jan. 1984), pp. 25-30 (1984).

J.E. Michaels, T.E. Michaels, B. Mi, A.C. Cobb and D.M. Stobbe, "*Self-calibrating ultrasonic methods for in-situ monitoring of fatigue crack progression*," Review of Quantitative Nondestructive Evaluation. American Institute of Physics, New York, vol. 24, pp. 1765-1772 (2005).

V. Giurgiutiu and J.J. Bao, "*Embedded-Ultrasonics Structural Radar for Nondestructive Evaluation of Thin-Wall Structures*," Proceedings of IMECE 2002: 2002 ASME Int'l Mechanical Engineering Congress, ImECE2002-39017, Nov. 17-22, 2002, New Orleans, Louisiana, pp. 1-8.

V. Zilberstein, K. Walrath, D. Grundy, D. Schlicker, N. Goldfine, E. Abramovici and T. Yentzer, "*MWM eddy-current arrays for crack initiation and growth monitoring*," Int. J. Fatigue, vol. 25, pp. 1147-1155 (2003).

S. Yamada, M. Katou, M. Iwahara and F.P. Dawson, "*Eddy current testing probe composed of planar coils*," IEEE Transactions on Magnetics, vol. 31, No. 6, pp. 3185-3187 (Nov. 1995).

J. Fava and M. Ruch (2004), "*Design, construction and characterisation of ECT sensors with rectangular planar coils*," Insight, vol. 46, Issue 5, pp. 268-274 (May 2004).

D. Placko and I. Dufour, "*Eddy current sensors for nondestructive inspection of graphite composite materials*," Industry Applications Society Annual Meeting, 1992, Conference Record of the 1992 IEEE, vol. 2, No. 4-9, pp. 1676-1682 (Oct.1992).

C.V. Dodd and W.E. Deeds, "*Analytical Solutions to Eddy-Current Probe-Coil Problems*," J. Appl. Phys., vol. 39, No. 6, pp. 2829-2838 (May 1968).

K. Stawicki, S. Gratkowski, T. Chady and M. Komorowski, "*Choice of Frequency in eddy current testing of tubes*," XII International Symposium on Theoretical Electrical Engineering, ISTET '03, Conference Proceedings, J. (Eds.), vol. II, Warszawa, Poland (2003).

W.J. Staszewski, "*Monitoring On-line Integrated Technologies for Operational Reliablity—MONITOR*," Air and Space Europe, vol. 2, No. 4, pp. 189-206 (2000).

J.B. Ihn and F.K. Chang, "*Monitoring Fatigue Crack Growth using a Pair of Piezoelectric Actuator/sensor: Part I. Diagnostics*," Smart Materials and Structures, (2003).

A.E. Crouch, T. Goyen and P. Porter, "*New Method Uses Conformable Array to Map External Pipeline Corrosion*," Oil Gas J. 102 (41), pp. 55-59 (2004).

D.J. Hagemaier, "*Eddy Current Impedance Plane Analysis*," Materials Evaluation, vol. 41, pp. 211-218 (1983).

W. Staszewski, "*Monitoring On-line Integrated Technologies for Operational Reliability—MONITOR*." Air and Space Europe, vol. 2, No. 4, pp. 67-72 (2000).

\* cited by examiner

Cross-section of a wing attachment fitting.

Figure 2: Structural health monitoring fastener

Figure 3: active coil geometries: spiral, planar rectangular, and meandering.

Figure 4: Interleaved active and passive coil geometry.

Figure 5: Planar rectangular and meandering excitation coils conformed into a bolt-hole. Dashed regions analyzed in an axisymmetric model (following).

Figure 6: Axi-symmetric geometry with highlighted unit cell for analytical determination of eddy currents in adjacent joint layer.

Figure 7: Eddy current density decay versus liftoff for a given excitation system.

Figure 8: Modeled region for sensor/flaw interaction (left) and final geometry of FEM (right).

FIG. 9  Contours of eddy current density in joint layer for flaws of increasing depth.

Figure 10: Total current on flaw surface versus flaw depth for different excitation coil designs.

FIG.11  Sensor film (left) conformed and bonded to thin metallic sleeve (right).

Figure 12: SHM fastener system showing components.

Figure 13: Data acquisition configuration.

Figure 15: Sensor power versus time for various flaw depths from FEM of sensor and crack.

Figure 16: Sensor power versus time for various flaw lengths from FEM of sensor and crack.

Figure 17: Damage index calculated from FEM results for various flaw depths and lengths.

FIG. 18 Static bench-top crack detection specimen. Slots of increasing size from top left to bottom right.

Figure 19: Sensor power time history for various cut depths.

Figure 20: Damage index versus crack depth [in] for static bench-top specimen.

Figure 21: Test progression for validation of SHM Fastener.

Figure 22: Starter flaw and loading conditions for single layer specimen #1.

Figure 24: Damage index versus cycle number for single layer specimen #2. Measurements were taken in a continuous, autonomous mode, with the damage index acquired at a rate of 0.15Hz.

Figure 25: Bonded, double-lap joint specimen geometry.

FIG. 27: Damage index versus cycle number obtained experimentally (top) and predicted crack size versus cycle number from AFGROW (bottom).

FIG. 28: Damage index versus cycle number obtained experimentally (top) and predicted crack size versus cycle number from AFGROW (bottom).

FIG. 29: Starter-flaw conditions for double lap-joint specimen.

FIG. 30: Damage index versus cycle number for bonded multi-layer specimen with single flaw on inner joint layer.

FIG. 32: Cross-section of coating layers and process steps taken to produce sensor features. Thermal spray is used to deposit each layer and laser ablation is used to cut away copper to form desired coil features.

INTEGRATED FASTENER-SENSOR ARRANGEMENT

RELATED PATENT DOCUMENTS

This patent document claims the benefit, under 35 U.S.C. §119(e), of U.S. Provisional Patent Application Ser. No. 60/967,774 entitled "Electromagnetic Fastener for Structural Health Monitoring" and filed on Sep. 7, 2007, which is fully incorporated herein by reference.

FIELD

The present invention relates generally to sensor applications, and to sensing structural characteristics such as those in areas adjacent or proximate to a fastener.

BACKGROUND

Many structures are susceptible to a variety of types of damage or failure. One of the most common forms of damage for many types of structures involves fatigue cracks that typically originate at holes or other fastener-type locations in structural joints. For example, heavy duty mobile vehicles such as planes, helicopters and military vehicles, and structures such as bridges and buildings, may include layers of metals that are secured together by a bolt or other fastener in a thru-hole passing through the layers. Assuring the proper fastening force during assembly of the structure, and detecting this force along with the health of the joint at the fastener location is important to maintaining the operability of these structures throughout their lifetime in service. Techniques for detecting and analyzing the status of joint health, fatigue, failure or other characteristics of materials that are fastened together, have generally involved using probes or sensors at various points on exposed surfaces of the layers or at unexposed layer interfaces.

Often, the placement and operation of the sensors after a vehicle or structure has been assembled requires that parts of the structure be disassembled. Many sensors are incapable of placement at locations that facilitate the detection of certain types of damage, such as damage at underlying layers or at structural locations that are otherwise difficult to access. Intrusive and destructive placement of sensors is often not desirable or not possible. Non-destructive approaches where sensors are placed on available surfaces often cannot provide desired analysis of characteristics of internal portions of the material under study.

These and other issues remain as a challenge for detecting structural and electrical characteristics of structures such as multi-layer structures.

SUMMARY

Various aspects of the present invention are directed to devices, methods and systems for detecting structural and/or electrical characteristics of multi-layer structures in a manner that addresses challenges including those discussed above.

According to an example embodiment, an integrated in-situ sensor device senses characteristics of a multi-layer structure during operation thereof. The device includes a mechanical coupler and a sensor circuit. The mechanical coupler couples layers of the multi-layer structure together via an opening traversing the multi-layer structure. The sensor circuit inserts into the opening with the mechanical coupler, induces an electrical response in a portion of the multi-layer structure adjacent the opening, and senses the induced electrical response. The electrical response is indicative of characteristics of the multi-layer structure, and a signal is provided from the sensed response to characterize the multi-layer structure.

In another example embodiment, a system includes a fastener arrangement, controller and processor to detect characteristics of a multi-layer structure. The fastener arrangement inserts into an opening traversing a multi-layer structure and fastens layers in the multi-layer structure together. The fastener arrangement also includes an active electrical conductor to induce an electrical response by a target portion of the multi-layer structure that is at or below an exposed surface of the structure and along a sidewall defining the opening, and a passive electrical conductor to sense the induced electrical response from the target portion of the multi-layer structure. The controller is coupled to control the active electrical conductor for applying the electric field. The processor is coupled to receive a signal corresponding to the induced electrical response from the passive electrical conductor and to process the signal for detecting a characteristic of the target portion of the multi-layer structure.

According to another example embodiment, a method for sensing characteristics of a multi-layer structure during operation thereof is as follows. Layers of the multi-layer structure are coupled together by inserting a fastener into an opening traversing the multi-layer structure. A sensor circuit is inserted into the opening with the fastener, and is used for inducing an electrical response in a portion of the multi-layer structure adjacent the opening, the electrical response being indicative of characteristics of the multi-layer structure, and for sensing the induced electrical response and providing a signal characterizing characteristics of the multi-layer structure.

According to another example embodiment, a method for detecting the force provided by a fastener during and/or after the installation of a fastener into a structure is as follows. Layers of a multi-layer structure are coupled together by inserting a fastener into an opening transversing the multi-layer structure. A sensor circuit is inserted into the opening with the fastener. During the installation process and/or at any desired point after the installation is complete, the electrical response of the circuit is measured to determine the fastening force provided by the fastener.

According to another example embodiment, a method for detecting damage to a fastener is as follows. Layers of a multi-layer structure are coupled together by inserting a fastener into an opening transversing the multi-layer structure. A sensor circuit is inserted into the opening with the fastener and is used for inducing an electrical response in a portion of the fastener adjacent the sensor, the electrical response being indicative of characteristics of the fastener, and for sensing the induced electrical response and providing a signal characterizing characteristics of the fastener.

According to another example embodiment, a corrosion detection arrangement detects a degree of corrosion in a battery. The arrangement includes an active electrical conductor to induce an electrical response by a target portion within the battery, and a passive electrical conductor to sense the induced electrical response from the target portion of the battery. A controller is coupled to control the active electrical conductor for applying the electric field. A processor is coupled to receive a signal corresponding to the induced electrical response from the passive electrical conductor and to process the signal for detecting a characteristic of the target portion of the battery.

The above summary is not intended to describe each embodiment or every implementation of the present disclosure. The figures and detailed description that follow more particularly exemplify various embodiments.

BRIEF DESCRIPTION OF THE DRAWINGS

The invention may be more completely understood in consideration of the following detailed description of various embodiments of the invention in connection with the accompanying drawings, in which.

Figure 1:
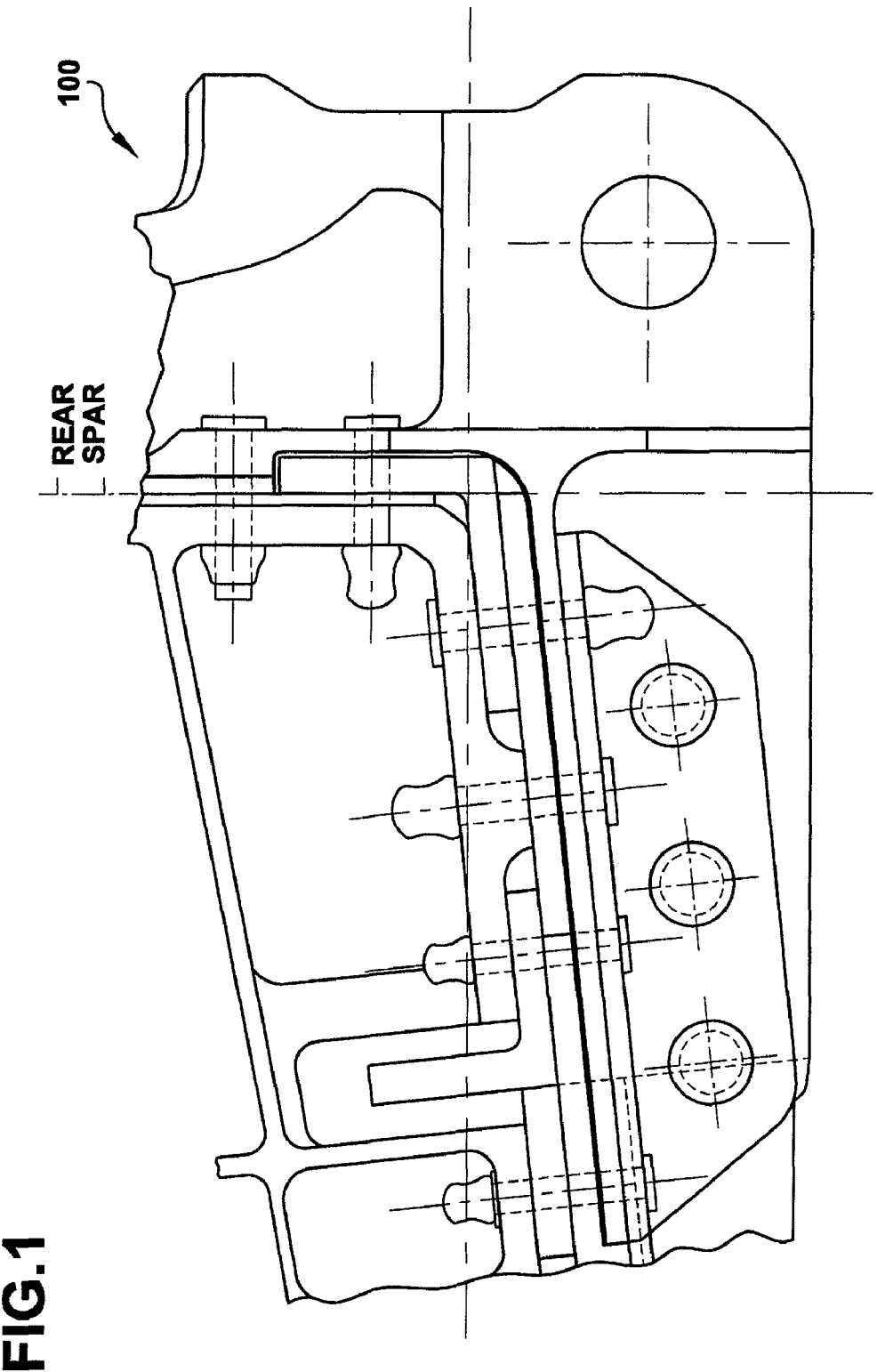
FIG. 1 shows a cross-section of a wing attachment fitting with an integrated fastener-sensor, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

The present invention relates to devices, methods and systems for detecting structural and/or electrical characteristics. While the present invention is not necessarily limited to such approaches, various aspects of the invention may be appreciated through a discussion of examples using these and other contexts.

In connection with an example embodiment, a sensor arrangement is implemented in connection with a fastener connected to a structure in order to test or otherwise analyze portions of the structure adjacent to the fastener. Such an approach is useful, for example, to analyze portions of a multi-layer structure that are below or under exposed surfaces and adjacent to fastener locations, such as fasteners used at airplane wing components that are bolted or otherwise fastened together. The sensor arrangement induces a response from the structure, detects the response and provides a signal corresponding to the detected response in order to detect characteristics of the structure. Detected characteristics may involve one or more of structural, electrical, corrosion and/or cracking characteristics of the structure.

According to various embodiments, a structural health monitoring fastener includes a conformable eddy current sensor film that is integrated with a metallic sleeve that goes around a fastener shank for in-situ monitoring of fatigue cracks at hole locations in layered joints of including conductive material (e.g., metal or semiconducting material). Sensors are integrated with the fastener shank to embed the sensors for detecting cracks in airframes, which most commonly initiate at bolt-hole boundaries in metallic components. The sensors are located in close proximity to the bolt-hole boundary through the entire joint stack-up, enabling detection of cracks on inner joint layers, which are otherwise inaccessible and cannot be detected by non-destructive inspection equipment without disassembling vehicle components.

An additive, interleaved, multi-layer, electromagnetic (AIME) sensor is used for this application. The sensor's salient qualities are an enhanced capability to inspect adjacent joint layers with high degrees of liftoff, or separation between sensor and joint layer, and a capability to track cracks out to great depth as they propagate from a thru-hole boundary. The analysis and design of the sensor film and sensor/fastener system are presented.

Various discussions herein refer to example embodiments involving a multi-layered bolted metallic joint. This discussion and various embodiments are also applicable to other fastened joints, involve other types of fasteners, materials and arrangements. In many embodiments, the sensor system can be permanently integrated with a joint to monitor cracks forming on any layer within the joint stack up, without requiring modification of the joint layers for the purpose of embedding the sensors.

Figure 2:
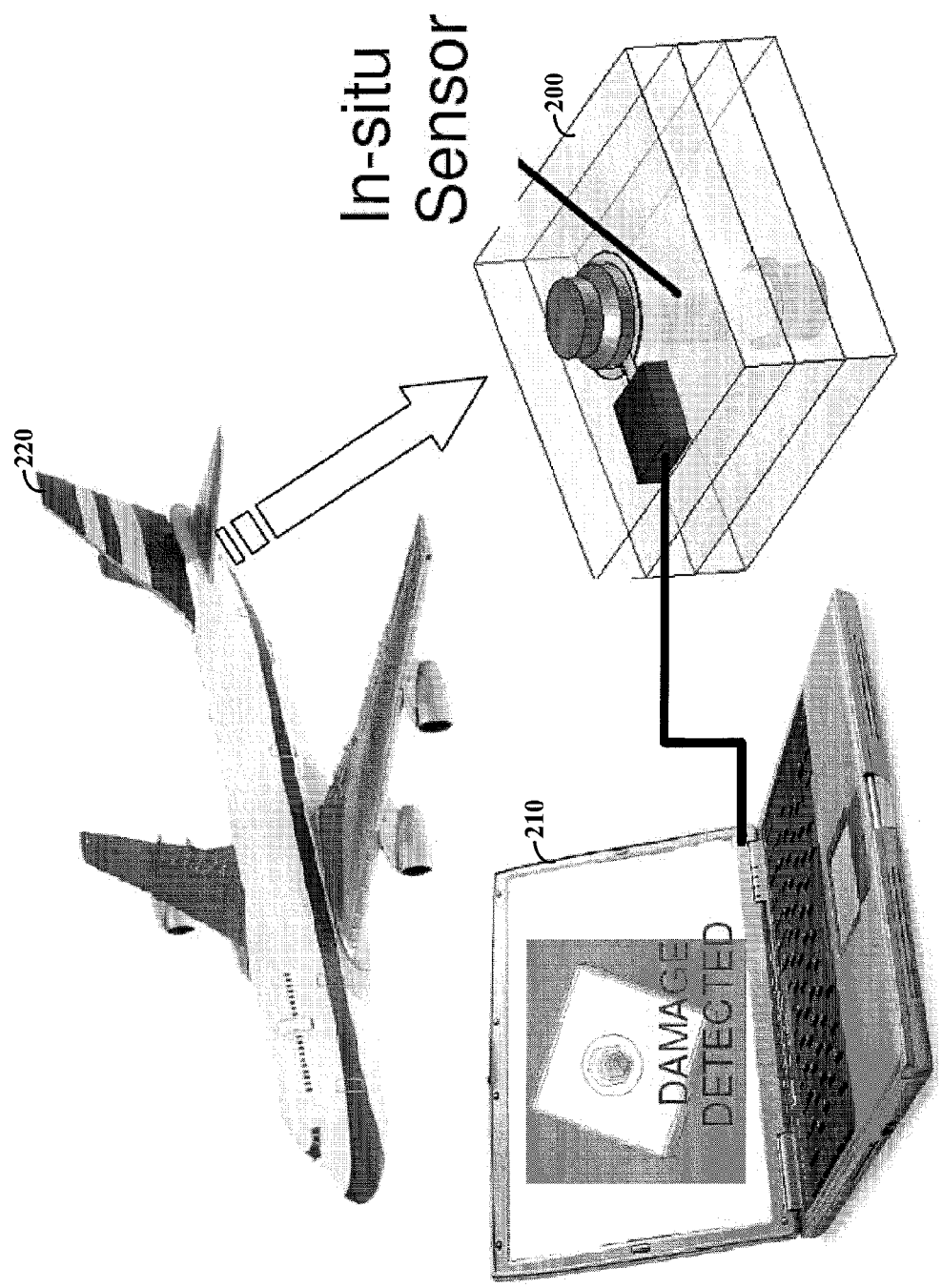
FIG. 2 shows a system for structural health monitoring, according to another example embodiment of the present invention.

In some embodiments, eddy current sensors are integrated on the shank of a fastening system that goes through a bolt-hole of a structure, such as an aircraft structure as shown by way of example in FIGS. 1 and 2. FIG. 1 shows an example wing attachment cross-section 100, and FIG. 2 shows an in-situ sensor 200 for insertion into an aircraft 220 and providing data to a processor 210 (computer). By integrating sensors on the fastener shank, inspection of the entire joint stack-up is facilitated since the sensors are placed adjacent to the bolt-hole boundary on all layers. Furthermore, sensors can be located right at the source of crack initiation. This leads to enhanced sensitivity and early detection of flaws, providing an improved in-situ methodology for diagnosis of fatigue damage in bolted joints.

In one embodiment, sensors integrated on the fastener shank facilitate inspection of the fastener both during installation of the fastener into the structure and during the service lifetime of the fastener. During installation, the resistivity of a single sensor conductor, integrated on the fastener shank is measured for a characteristic directly related to the tension in the fastener. This resistivity is then measured during inspection processes throughout the lifetime of the joint to detect fastener loosening.

In another embodiment, conductors integrated on the fastener shank are used to induce electrical currents in the underlying fastener, and the response of the fastener to those currents is sensed to detect any damage in the form of cracks (e.g., fatigue cracks) and/or corrosion of the fastener.

In one embodiment, an additive, interleaved, multi-layer electromagnetic (AIME) sensor is a conformable eddy current film sensor that has been refined to enhance the capability to inspect adjacent joint layers with liftoff and to track cracks to great depths from the thru-hole boundary.

Eddy current devices amenable to use with the present invention are described, for example, in references 7-10 cited in the references section below. These references present different example approaches for implementing excitation coils in connection with various example embodiments, such as for a circular or pancake coil, a meandering excitation system, and a planar rectangular coil.

In connection with various example embodiments, sensor arrangements implemented herein are manufactured and/or implemented to set induced eddy current direction, facilitate enhanced sensitivity, provide for inspection without contact between sensor and joint layer (with sensor liftoff), and tracking of flaws to increasing depths from bolt-hole boundaries.

Figure 3:
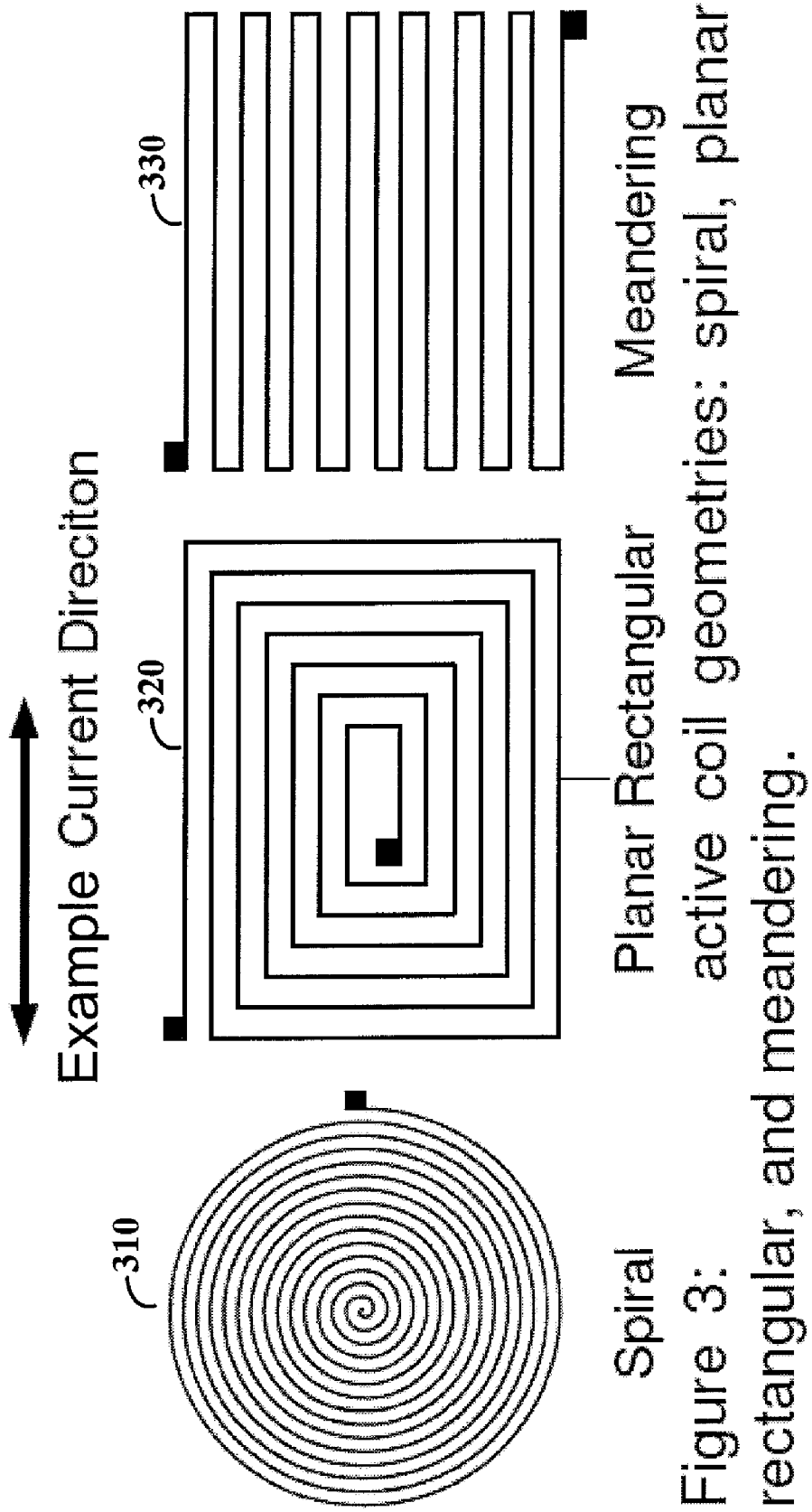
FIG. 3 shows example coil geometries, according to another example embodiment of the present invention.

FIG. 3 shows some potential excitation (or active) coil geometries 310, 320 and 330, including circular, planar rectangular and meandering coil designs. When such coils are integrated into a conformable film and wrapped around the shank of fastening system, the currents produced by the coil flow perpendicular to the axis of the fastener since the eddy current response is highest for cracks that are forming perpendicular to the current direction. Of the prospective active coil layouts shown in FIG. 3, various discussion herein is based upon the planar rectangular and meandering designs by way of example.

In the case of the planar rectangular design, one embodiments involves using a coil laid out on two layers, with the coils wound such that the current is additive on both layers and in all legs of the coil. Since the winding of the planar coil demands a second layer in order to runout the coil trace once it reaches the inside of the layout, introduction of an additional layer of coil winding may be inconsequential for the final film thickness. This produces a high number of turns for an increased magnetic field strength and improved signal to noise ratio.

In some applications, non-destructive inspection is carried out with such coils as eddy current devices, by measuring the electrical impedance of a single active coil and relating impedance changes to the presence of flaws. Such approaches may involve, for example, those similar to approaches described in references 11 and 12 cited at the end of this detailed description section.

In some applications, a two-coil approach is used, wherein a second, passive coil is used in addition to an excitation coil to facilitate desirable sensitivity and signal to noise ratio. The induced voltage on this second passive coil can be measured and responds to the magnitude of the total magnetic field around the active coil, which is a function of the eddy currents and their response to cracks in a material under test (joint layer).

In a two coil system, the strength of the induced field from the active coil is a function of the number of additive turns within this coil. Likewise the magnitude of the induced voltage on the passive coil is a function of the number of additive turns in this coil according to Faraday's Law. Increasing both the field strength from the active coil and magnitude of the induced voltage on the passive coil leads to a higher signal to noise ratio for the sensor.

Figure 4:
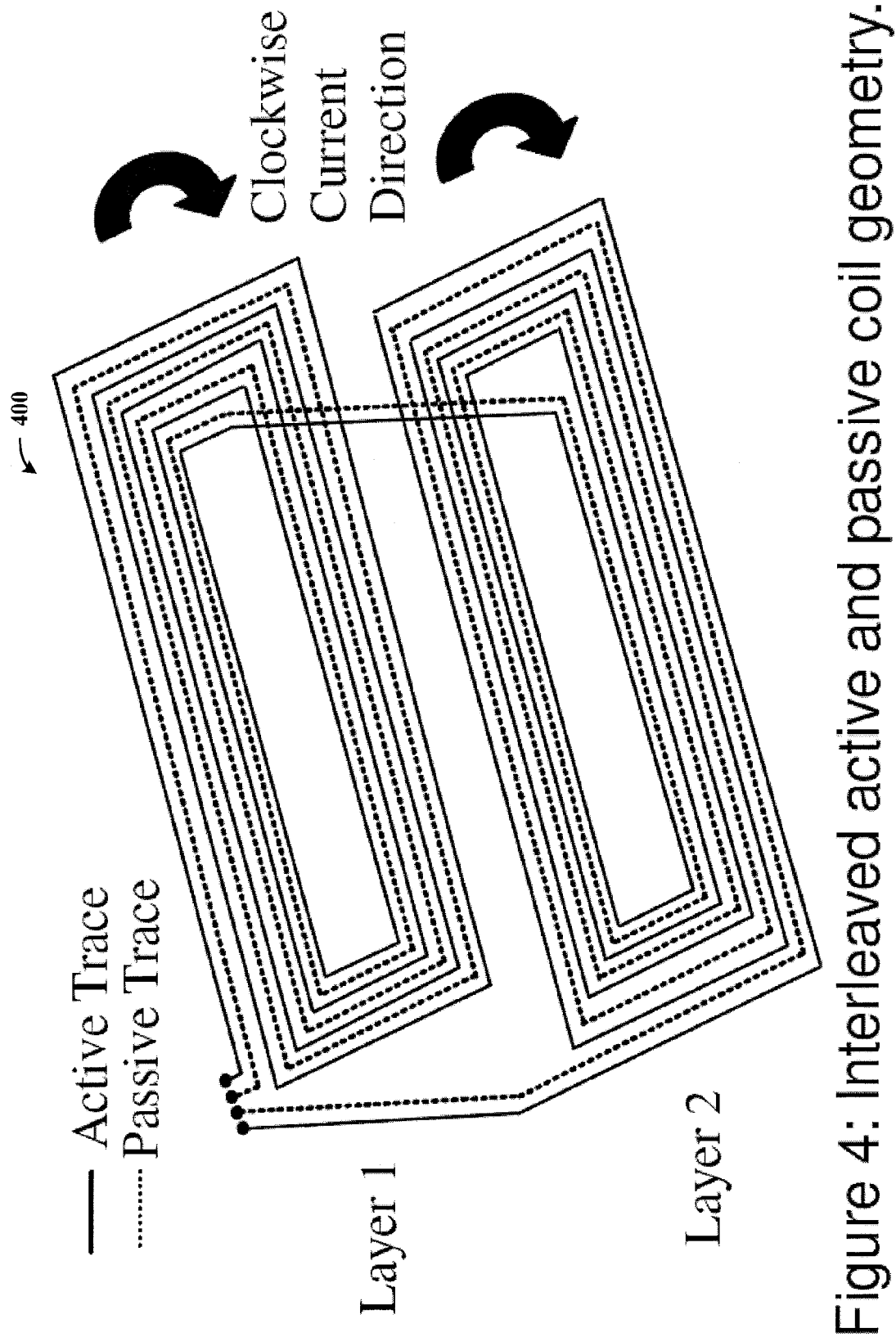
FIG. 4 shows interleaved active and passive coil geometries, according to another example embodiment of the present invention.
Figure 11:
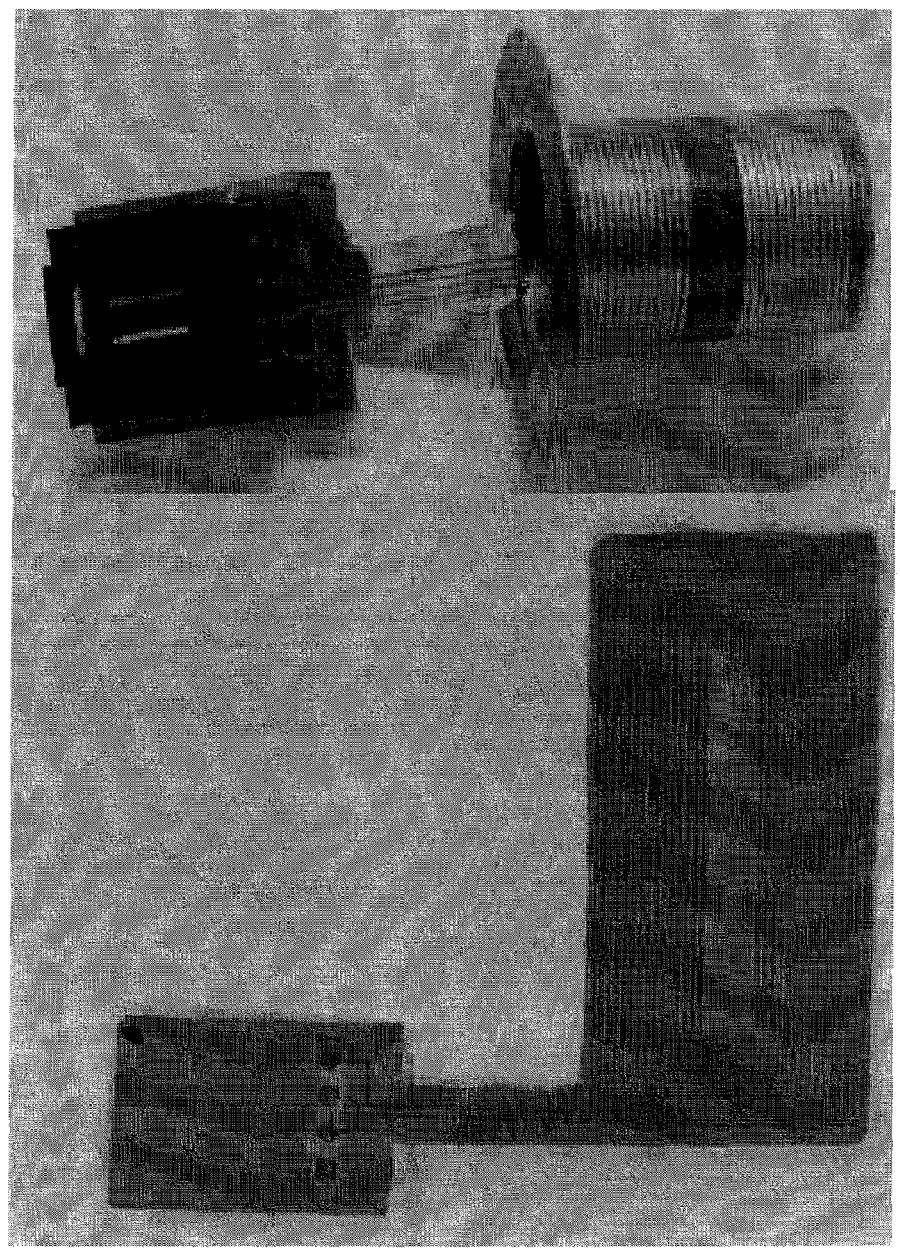
FIG. 11 shows a sensor film with example bonding to a sleeve, according to another example embodiment of the present invention.

Introduction of a second coil can potentially lead to an unwanted increase in the sensor film dimensions. In light of this and according to various embodiments, active and passive coils are interleaved as shown in windings 400 of FIG. 4 for the planar rectangular coil geometry. A similar interleaving (on one layer only) can be implemented for a meandering design. FIG. 4 shows two layers with planar coils on each layer that are wound such that the current is additive in the legs of the coil. Interleaved within the active coil is a passive coil, used to detect changes in the induced field from the excitation coil and eddy currents in the joint layer. This approach thus involves an additive, interleaved, multi-layer, electro-magnetic sensor, or AIME sensor. An example related sensor film is shown in FIG. 11 (left).

According to a more particular example embodiment, a sensor arrangement is implemented under conditions involving separation between the sensor and joint layers that are held together and in which characteristics are desirably detected. These sensors are applicable for use in slip-fit and interference fit applications (e.g., the latter of which may pertain to integration of the sensor with a fastener shank). In some embodiments, to increase the survivability of sensors when permanently installed, wear resistant layers are applied to mitigate wear, with the sensors being amenable to sensing (inducing and detecting a response) device characteristics.

In some applications, the sensor arrangement is implemented to detect and track flaws as they grow radially from a bolt-hole boundary. The sensor is accordingly inserted with a fastener to detect in-situ increases in crack depth which may, for example, occur over days, months or even years.

In some design-based embodiments, finite element (FEM) code Ansoft Maxwell 3D, can be used to model excitation systems and the interaction of induced eddy currents with flaws of various sizes within a joint layer. To reduce the computational intensity of the FEM, the modeled region can be reduced to a small segment of the overall geometry (e.g., as illustrated in FIG. 8, showing planar rectangular (810) and meandering (820) coil applications for a segment 830).

Figure 8:
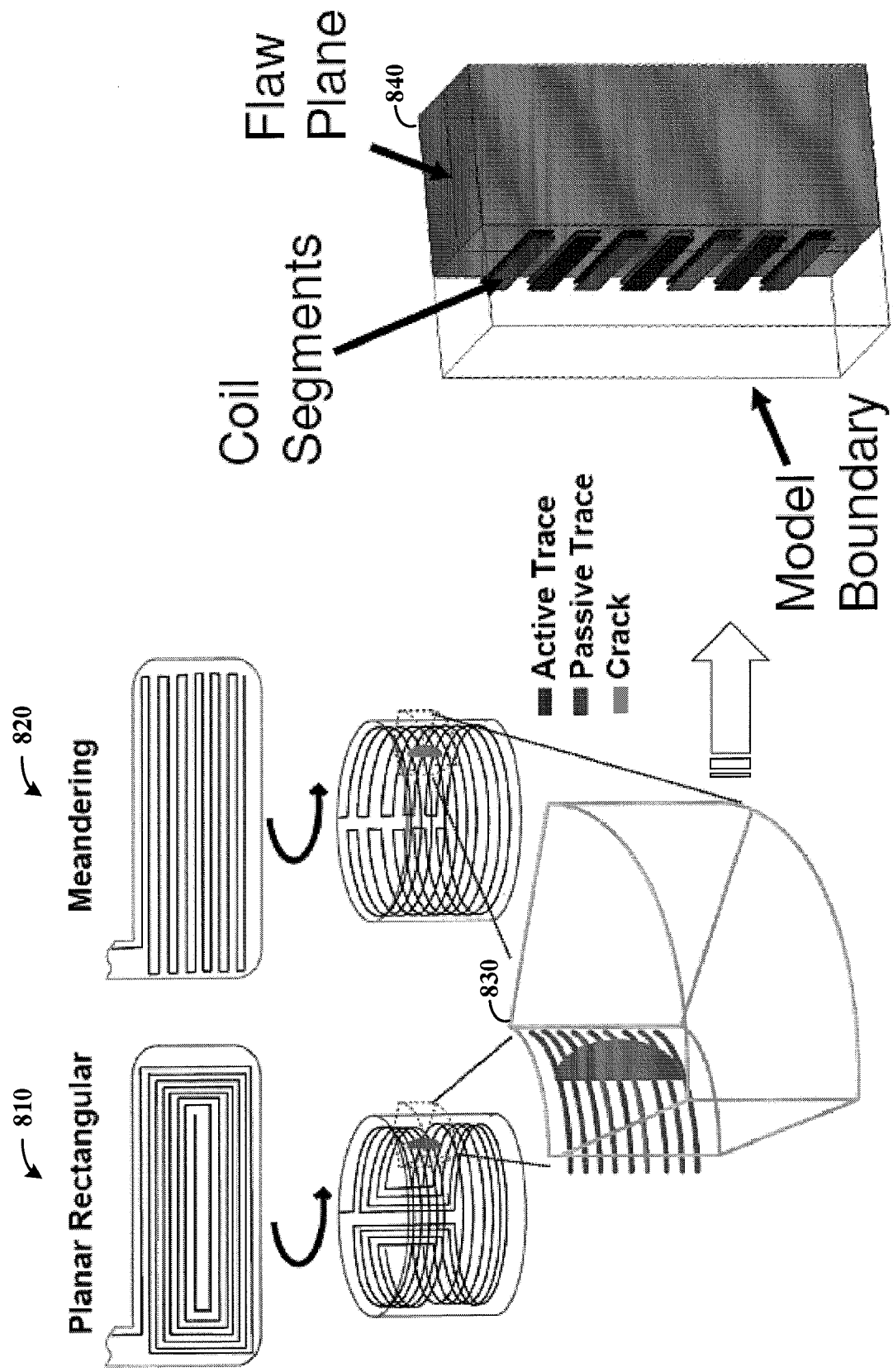
FIG. 8 shows a sensor coil and flaw interaction, according to another example embodiment of the present invention.

To the right of the modeled region in FIG. 8 is the FEM geometry 840. The FEM region has been flattened (e.g., assuming that there is no effect caused by the slight curvature in the sensor due to the cylindrical geometry). The underlying sleeve and fastener are not included in the model since any eddy currents included in these regions are assumed to be constant and irrelevant for eddy current and flaw interaction.

Figure 9:
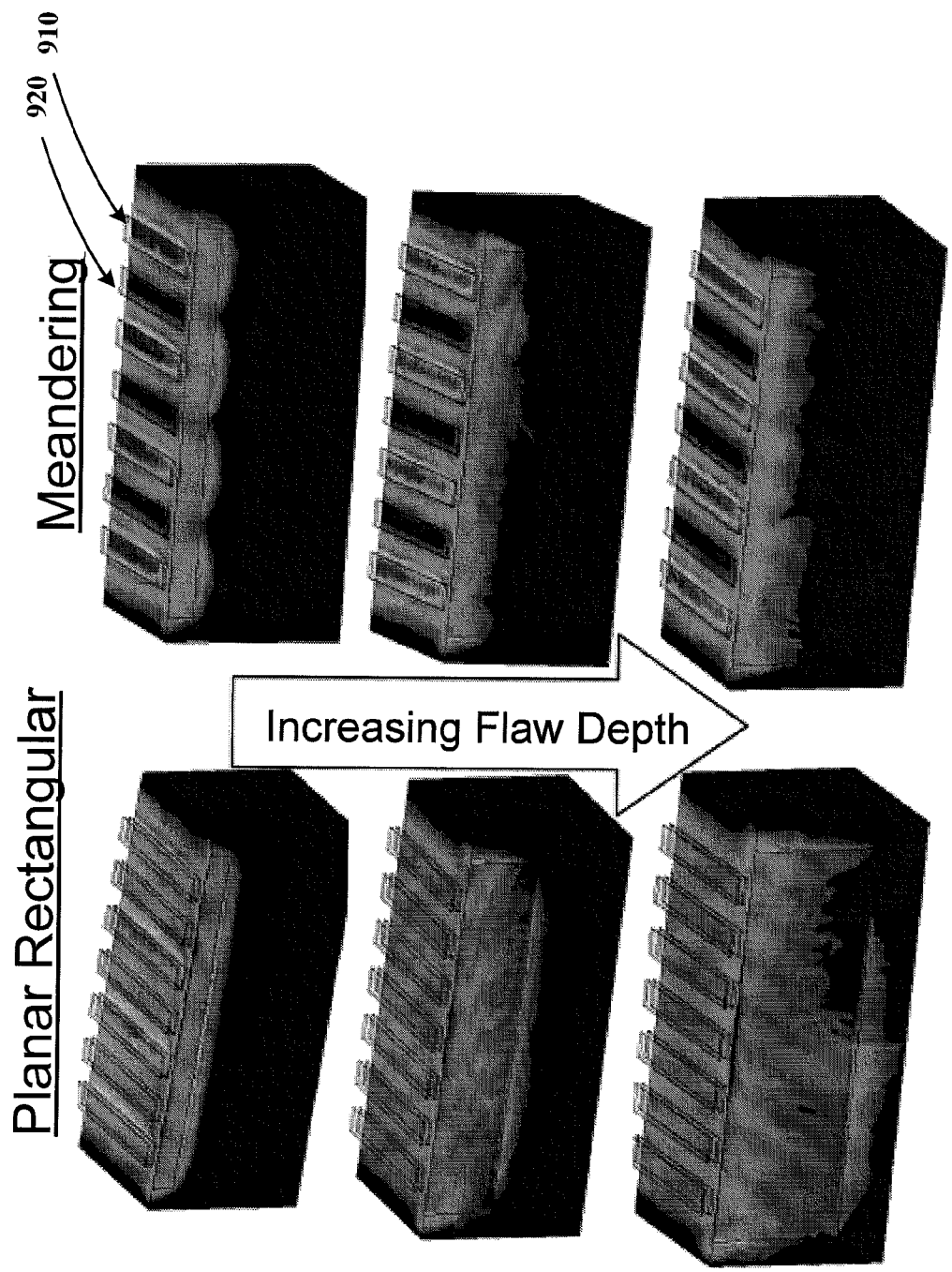
FIG. 9 shows example detection of flaws via eddy current density, according to another example embodiment of the present invention.

As shown in FIG. 9, the FEM contains both active and passive coil segments, which are interleaved on one or two layers (alternating ones of the coil cross-sections are shown, with segments 910 and 920 labeled by way of example). The model boundary restricts the magnetic field to be tangent at this location, which confines the solution to be within this domain. Within the joint layer material is a flaw plane as indicated in FIG. 8. In this plane is an insulating boundary, of about zero thickness, which limits the eddy currents from flowing across its surface. This is an example method for modeling a crack in this FEA. The length, l, and depth, d, of the simulated crack can be adjusted to study the change of eddy current response to changes in the crack size. Similar approaches are applied to in-situ testing of material layers, such as those in aircraft, automobiles, bridges or other structures under test.

Referring again to FIG. 11, a film 1110 is shown and applied for bonding to form an integrated sleeve 1120. The film 1110 has a tab runout where a connector can be affixed for connecting to the sensor network or data acquisition system and this runs through a slot in the flange of the sleeve.

In some embodiments, an active/passive coil arrangement as described herein is used to detect a condition of corrosion in a battery arrangement. For example, referring to FIG. 11, an integrated sleeve 1120 can be inserted into a battery and/or around a battery cell to detect corrosion characteristics therein. Such an approach can be used to detect characteristics of the battery as may be related to the life or other operational condition thereof. This approach is also applicable to a variety of batteries, such as those used in electric or hybrid automobiles, to facilitate the detection of the health of the batteries used to propel an automobile.

Figure 12:
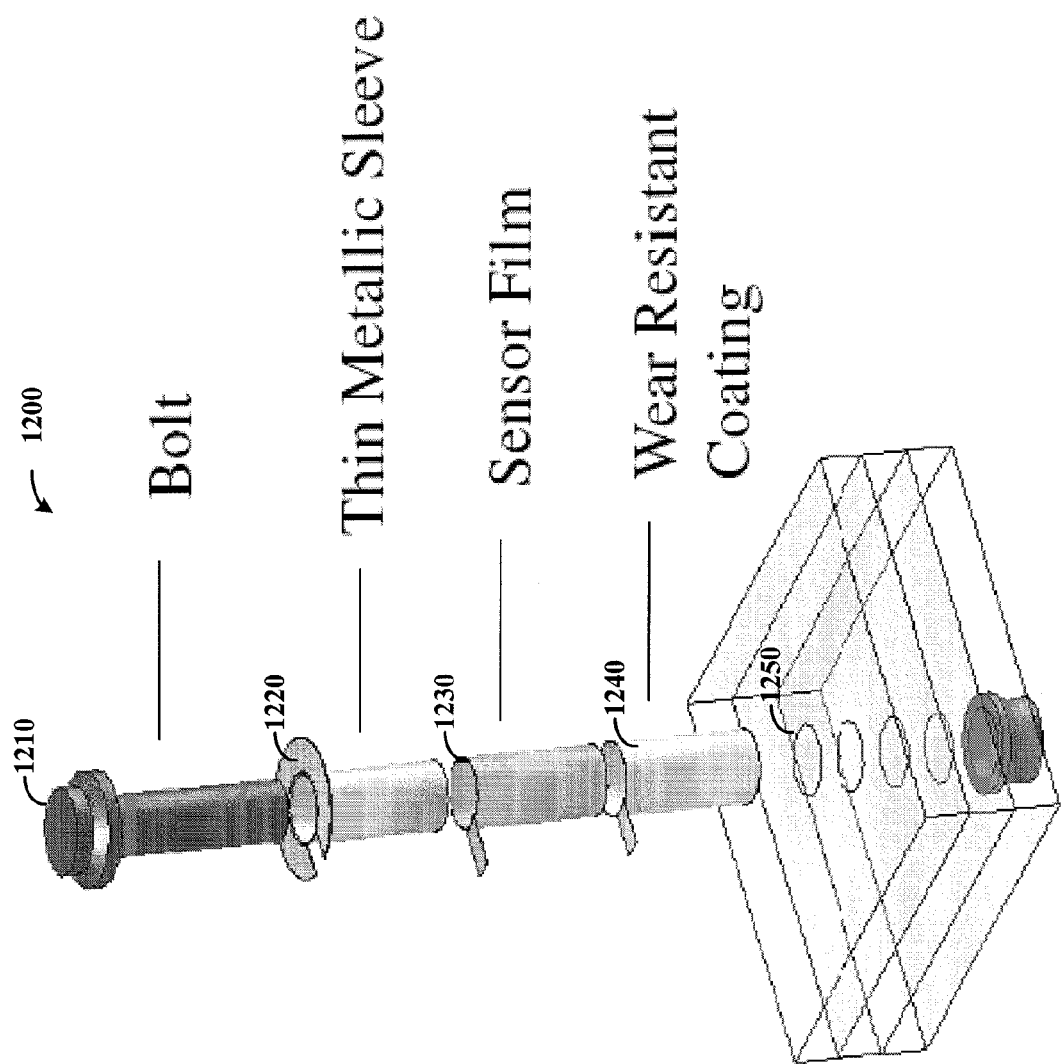
FIG. 12 shows a structural health monitoring system, according to another example embodiment of the present invention.

FIG. 12 shows an SHM fastener system 1200, according to another example embodiment of the present invention. The system includes a fastener (bolt) 1210, a metallic sleeve 1220, a sensor film 1230 and a wear-resistant coating 1240. The fastener shank is press-fit into the inner diameter of the sleeve during an installation (e.g., into an opening 1250 in a multilayer structure to be analyzed). This expands the sleeve and sensor radially outward such that the sensor is brought into proximity with the adjacent joint layer at a bolt-hole boundary. The tab of the sensor, run-out underneath the head of the fastener is protected from bearing loads by the flange of the sleeve in the fastening system.

Figure 13:
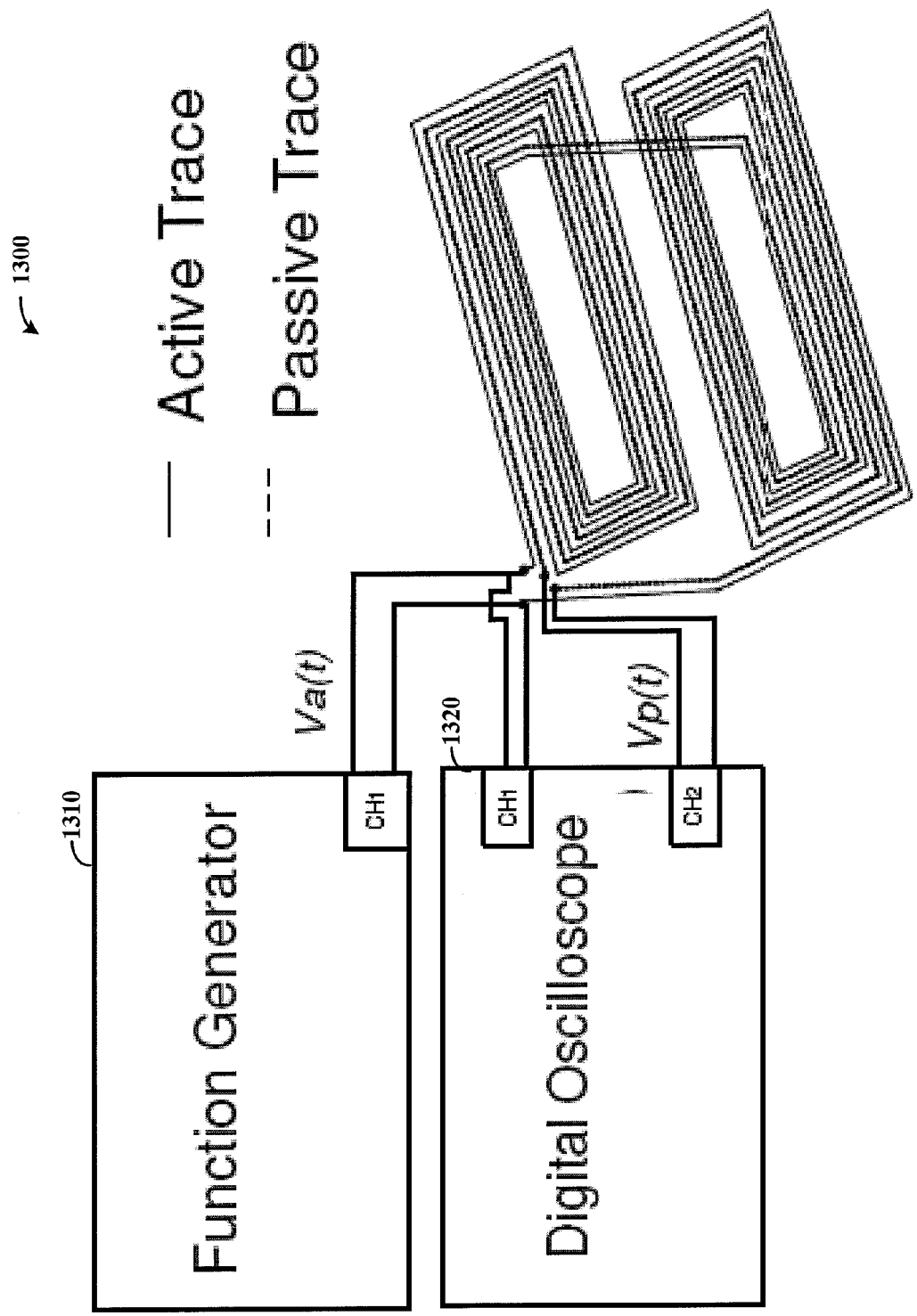
FIG. 13 shows a data acquisition system, according to another example embodiment of the present invention.

Signals from both the active and passive coils in the sensor 1230 contain information about the presence of cracks in the adjacent joint layer. Therefore, both the voltage on the active coil, Va(t), is measured along with the induced voltage on the passive coil, Vp(t) as shown in FIG. 13. The product of these two are taken to be the sensor power, P(t), for the sensor.

At beginning of life of the structure, assuming pristine conditions within the thru-hole, a baseline measurement PB(t) of the sensor signal is taken and stored. Subsequent signal measurements, P(t) are then taken and the baseline signal is subtracted from them to form the scatter signal, Ps(t) according to Equation 1.

$$P_S(t) = P(t) - P_B(t) \qquad \text{Equation 1}$$

A damage index, DI, similar to one previously formed for piezo acousto-ultrasonic systems by Ihn and Chang [5] is then formed by taking the root mean square (RMS) value of this scatter signal and scaling it by the RMS value of the baseline signal as shown in Equation 17.

$$DI = \frac{\sqrt{\frac{1}{t_2 - t_1} \int_{t_1}^{t_2} P_S(t)^2 dt}}{\sqrt{\frac{1}{t_2 - t_1} \int_{t_1}^{t_2} P_B(t)^2 dt}} \qquad \text{Equation 17}$$

Figure 14:
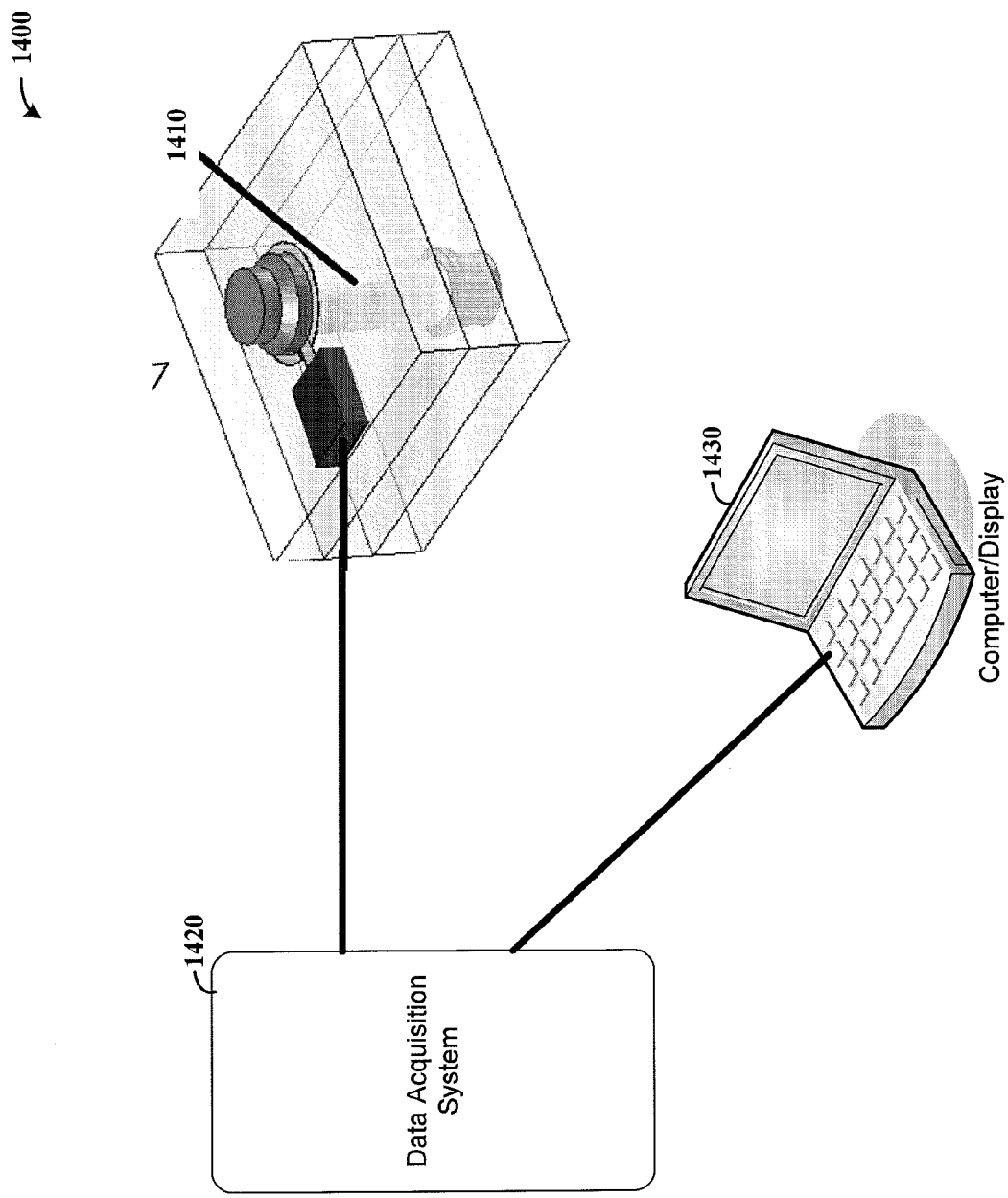
FIG. 14 shows a system for detecting characteristics of a multi-layer structure, according to another example embodiment of the present invention.

FIG. 14 shows an example structural health monitoring (SHM) fastener system 1400, including a sensor/fastener arrangement 1410 connected to a portable data acquisition system 1420 with a real-time display/computer 1430, according to another example embodiment of the present invention. The data acquisition system 1400 may, for example, be implemented with a high-frequency function generator and digital oscilloscope with a sampling rate of up to 200 MHz (e.g., as relevant to FIG. 13).

Sensors are activated with a sinusoidal voltage (e.g., at a frequency of 5 MHz, which can be higher or lower based on the material under test, desired material characteristic that is sought, signal acquisition hardware or other characteristic). Sensor measurements can be acquired either incrementally, or in a real-time mode where measurements are taken a frequency of once per six seconds. The display 1430 may present a joint health status monitor (green, yellow, or red indicator) and a real-time plot of the damage index versus cycle number when sensors are run in a real-time mode.

In connection with various embodiments, an integrated SRM fastener/sensor arrangement as described herein may be located at the initiation site of fatigue cracks forming at bolt-hole boundaries, and used to inspect layers within a multilayer joint with sensor placement in proximity with the thru-hole boundary on all layers of a joint. Many embodiments are directed to retro-fit applications involving the replacement of existing bolts or other fasteners with fastener/sensor arrangements as described herein.

According to other example embodiments, an integrated fastener/sensor arrangement includes a sensor that is coated onto a fastener shank, which is inserted into an opening in a structure to be tested. This approach may be implemented using one or more of the above-discussed embodiments, as well as those described below and shown in corresponding figures.

Figure 31:
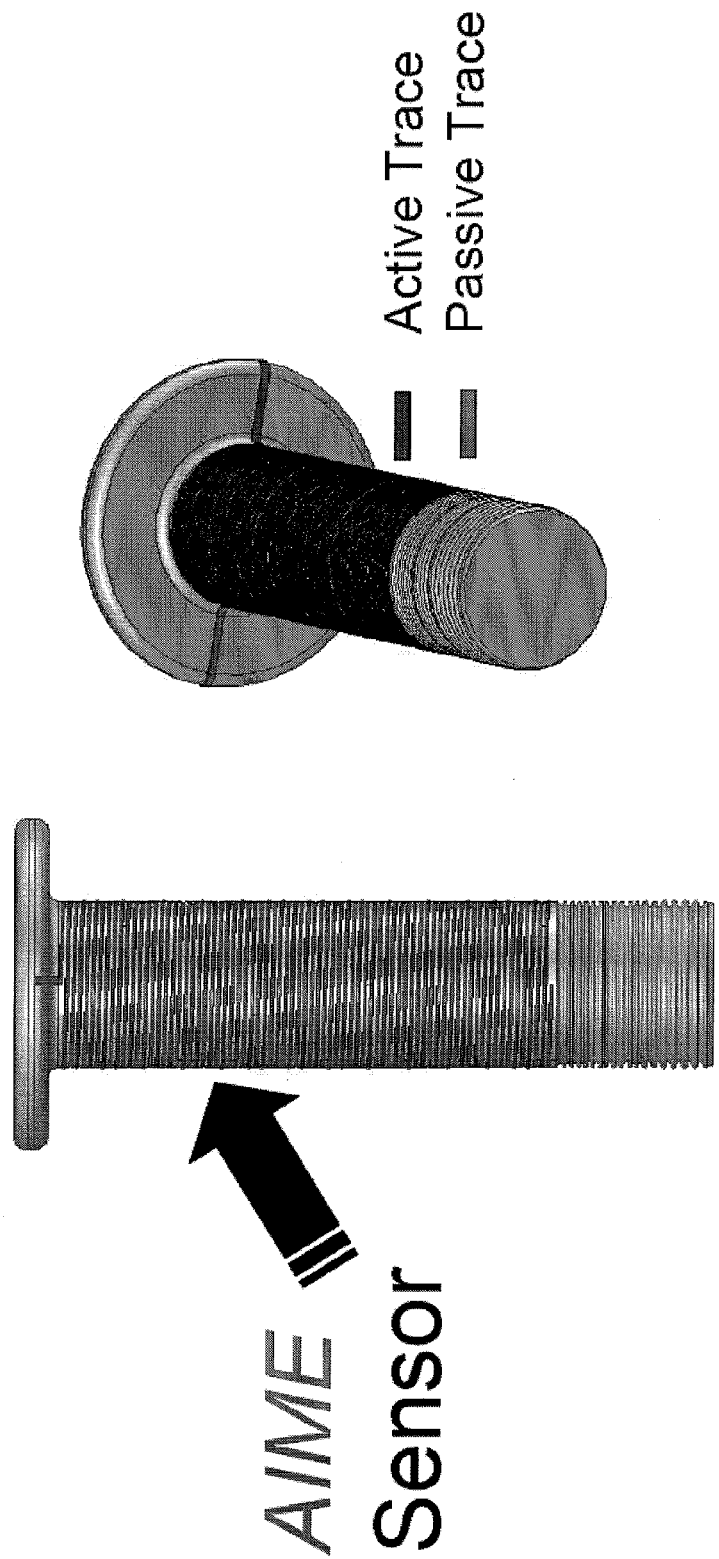
FIG. 31 shows an integrated fastener-sensor arrangement, according to another example embodiment of the present invention.

FIG. 31 shows such a sensor arrangement 3100, according to another example embodiment of the present invention. The sensor arrangement 3100 is a fastener with interleaved active and passive sensor traces that run down its shank.

Figure 32:
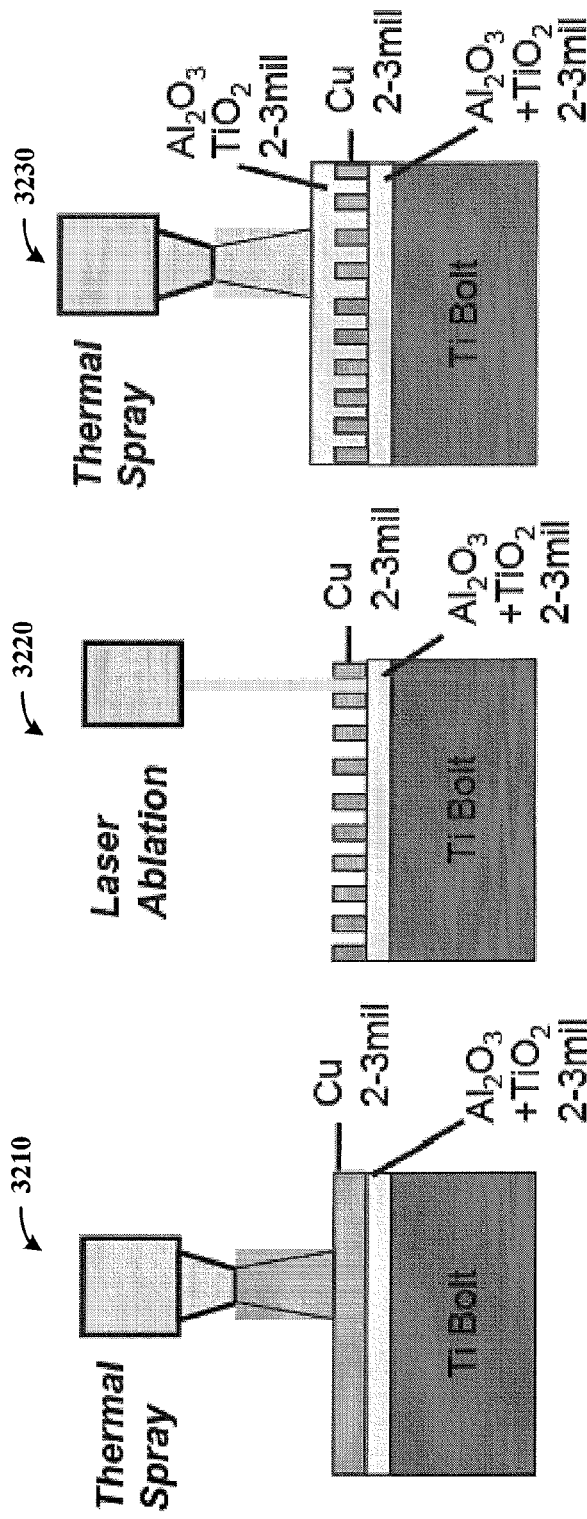
FIG. 32 shows an approach to forming an integrated fastener-sensor arrangement, according to another example embodiment of the present invention.

FIG. 32 shows an example approach to forming a sensor arrangement such as shown in FIG. 31. Respectively, thermal spray is carried out at 3210, laser ablation at 3220 and another thermal spray step at 3230. The thermal spray step 3210 involves spraying a conductive material (copper by way of example) onto a bolt shaft. At step 3220, laser ablation is used to cut away the sprayed conductive material and form windings. At step 3230, another thermal spray application is used to form an additional coating (e.g., for protection, with about 2-3 mils of coating).

The thermal spray process shown in FIG. 32 can be carried out in a variety of manners. In one application, a powder is fed into the nozzle of a spray gun, where an arc is formed across the nozzle tip by applying high voltage across an inert gas such as argon that is fed through the gun. The combustion of the materials in the nozzle tip atomizes and accelerates the materials out the nozzle of the spray gun in small molten droplets which impact, or splat, then flatten, and cool, upon a substrate. Several passes can be used to build up a layer of overlapping droplets upon the substrate. In some applications, the coating is ground after application.

In one implementation, coated layers are deposited onto a 0.5" diameter titanium fastener. The layer deposited at step 3230 (and, in some instances, before metal deposition at step 3210) is $Al_2O_3$ (alumina) mixed with $TiO_2$ (titania) at a mixture of 80 and 20 percent respectively, and machine ground to a final layer thickness between 2 and 3 mils. Alumina can be used as a dielectric and wear resistant material. This ceramic is a dielectric, shielding the copper sensor layer from contact with the underlying part and from the joint layer materials, and has good wear resistance.

After application of a first alumina layer, copper is sprayed down on top of the alumina layer at 3210 to produce a layer 2-3 mils thick. In some applications, the deposited copper is not ground to facilitate adhesion. In certain embodiments, the copper is annealed (e.g. for 1 hr in an atmosphere of argon at a temperature of 1466 F) and then furnace cooled back to room temperature, to facilitate conductivity.

Figure 33:
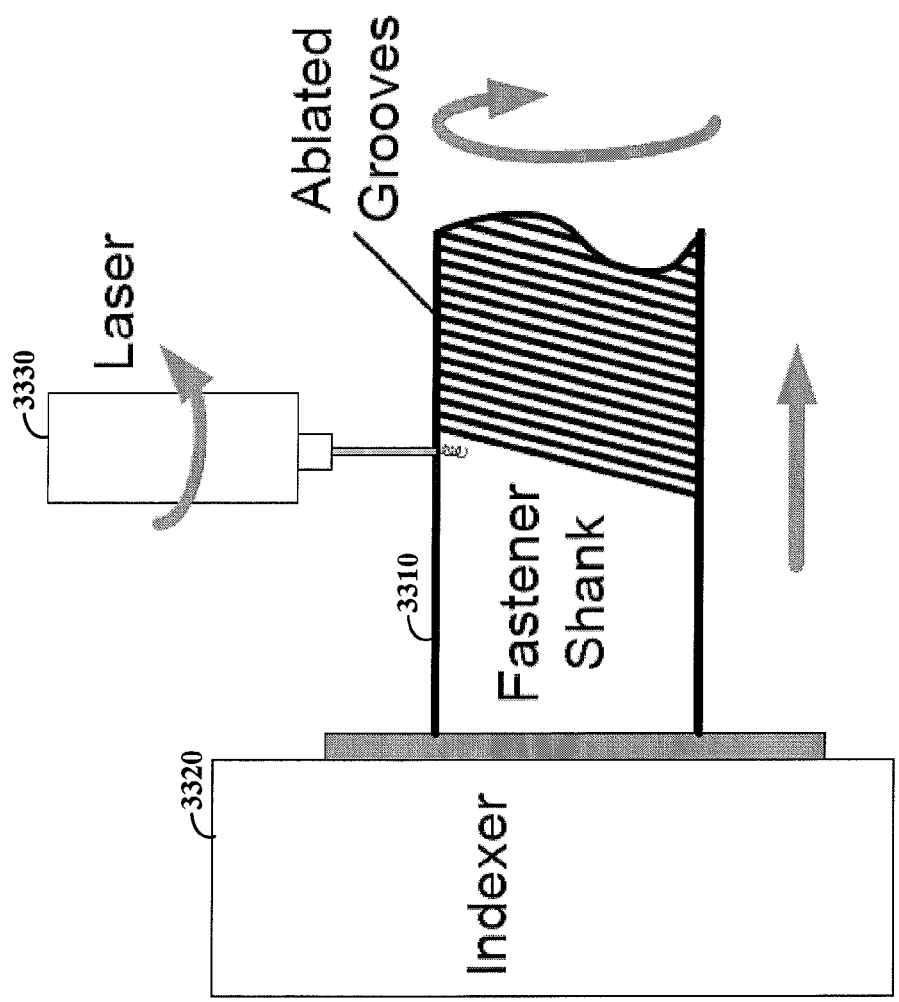
FIG. 33 shows another approach to forming an integrated fastener-sensor arrangement, according to another example embodiment of the present invention.

The laser ablation step at 3220 is used to form copper (or other metal) features as desired for a particular sensor application. For example, a 355 nanometer wavelength Neon Indium doped Itrium laser with a 35 nanosecond pulse at 1.23 watts can be used to carry out such an approach. FIG. 33 shows an example approach to laser cutting at step 3220, to produce helical coil features. This approach includes rotating a fastener 3310 in an indexer 3320 while a laser 3330 is revolved, with the fastener translated in the axial direction to produce a cut down the fastener shank. The speed of the part's translation and rotation are controlled such that there is adequate overlap between successive ablated areas to produce a clean cut between traces.

While various applications described herein, including those shown in FIGS. 31 and 32 involve a fastener shank, a similar or the same coating process is applied on other fasteners or upon a thin metallic sleeve as discussed above. Furthermore, as only one conductive layer is shown applied, two or more such layers may be applied, and interleaved conductor may be formed using different materials. In a more particular embodiment, two layers of copper traces are applied and processed, the first running down the fastener shank and the second running back up the fastener shank with active and passive traces interwoven on each layer.

While the present invention has been described above, in the figures and in the Experimental Embodiment section and claims that follow, various devices, systems and approaches may be implemented in connection with and/or in addition to the example embodiments described above. For instance, embodiments described in reference to the figures may be implemented using different systems and approaches. Embodiments described without specific reference to the figures may be implemented with the figures. Other experimental embodiments may be implemented in connection with each other, other embodiments and the figures. Embodiments of the invention can function without necessarily requiring bonding or contact between the sensors and material under test. This accommodates the fastener thru-hole environment where contact with joint materials cannot be guaranteed in operation. Various ones of the coil patterns and coil structures may be used in applications that are different from those discussed herein. For example, a film that includes a coil pattern can be inserted or inlaid into a notch, groove, depression or other structure of a carrier (such as a bolt or fastener) or the material to be sensed. In addition to physical effects, other effects or characteristics of materials may be sensed such as corrosion or other effects due to one or more of chemical, radiation, electromagnetic or other causes.

Although the fasteners described herein may include both electromagnetic emitting and sensing elements, other embodiments may include only one or the other. For example, a fastener may only need to include an emitting (active) coil and the sensing may be performed by a different apparatus (e.g., a different fastener, the material itself). In some embodiments, the material sensed is not necessarily a metal, and may be any material that is susceptible to electromagnetic eddy current type of sensing. For example, conductive or semi-conductive polymers, substrates or other materials amenable to the inducement of a response characterizing structural characteristics may be adaptable for use with embodiments of the present invention.

Different types of sensing may be adaptable with features of the invention. In general, currently known or future-developed sensing techniques (e.g., GMR, Hall Effect, etc.) may be adaptable for use with embodiments described herein to attach an element of the sensing technique to a fastener for efficient non-destructive types of sensing according to the embodiments described herein.

A suitable programming language can be used to implement the routines of particular embodiments, such as C, C++, Java, and assembly language. Different programming techniques can be employed such as procedural or object-oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be a medium that can contain, store, communicate, propagate, or transport the program for use by or in connection with the instruction execution system, apparatus, system, or device. The computer readable medium can be, by way of example, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved using one or more approaches as known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or removed and/or rendered as inoperable in certain cases, as is useful in accordance with a particular application. It is also within the spirit and scope to implement a program or code that can be stored in a machine-readable medium to permit a computer to perform one or more aspects of the approaches described above.

In view of the description herein, those skilled in the art will recognize that many changes may be made thereto without departing from the spirit and scope of the present invention.

EXPERIMENTAL EMBODIMENTS

The following discussion characterizes several example experimental embodiments, some of which may be implemented in connection with one or more of the embodiments described herein.

Figure 5:
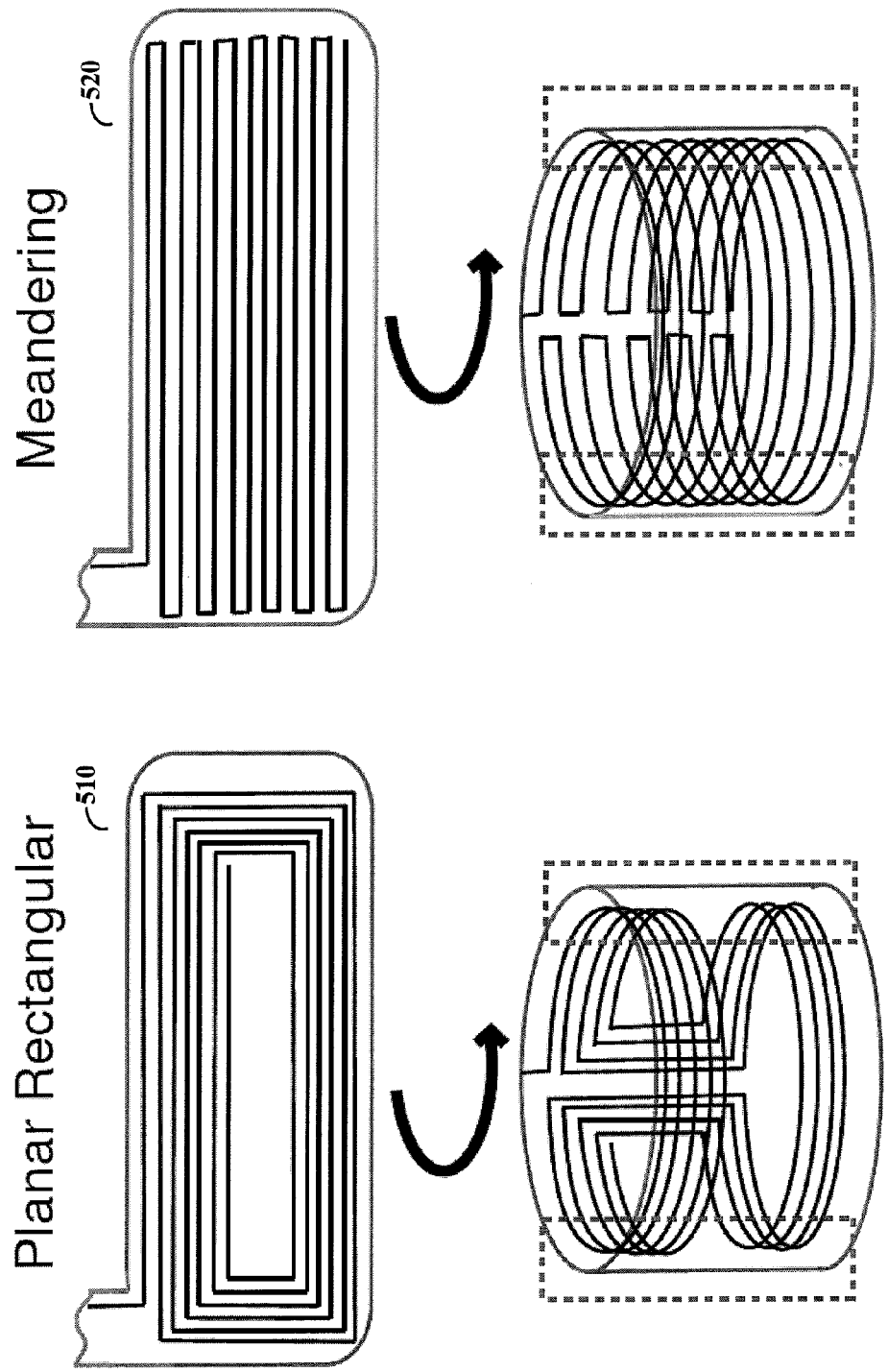
FIG. 5 shows excitation coils, according to another example embodiment of the present invention.

A comparison between a meandering and planar coil sensor's capability to interrogate an adjacent joint layer with liftoff was carried out. Of interest for this comparison is the eddy current density on the surface of the joint layer and how its magnitude is diminished as there is increased separation between the sensor and joint layer. To analyze this, a cylindrical model for the regions highlighted in the dashed boxes in FIG. 5 was developed for a planar rectangular 510 and meandering coil 520 film that are wrapped cylindrically and placed in a thru-hole.

Figure 6:
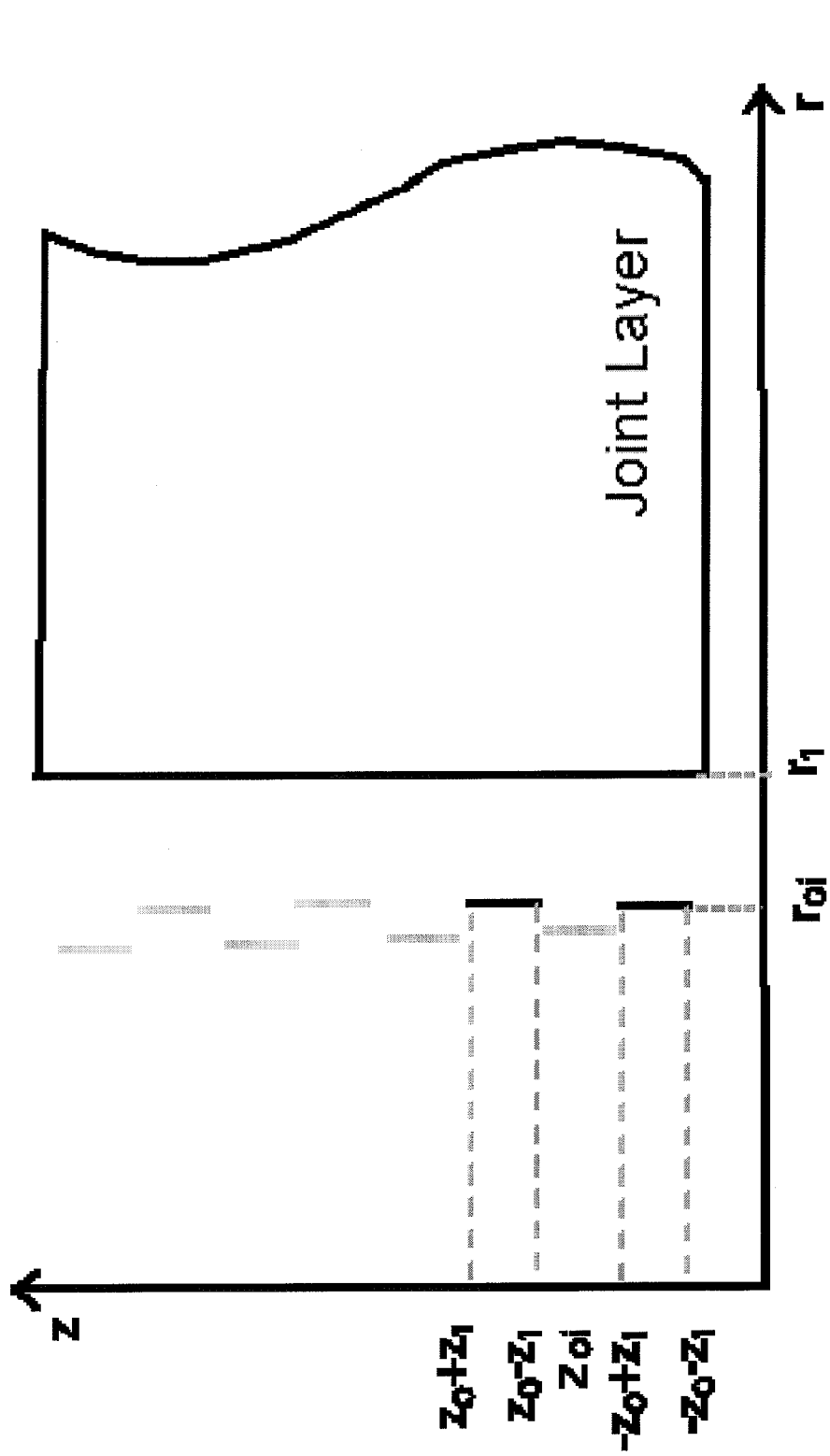
FIG. 6 shows a plot for sensing structural characteristics, according to another example embodiment of the present invention.

To solve for the eddy current density, the closed form solutions illuminated as described in references 13 and 14, considering an axi-symmetric geometry as illustrated in FIG. 6.

The magnetic vector potential, A, in cylindrical coordinates can be found according to Equation 1 below. Here j represents an imaginary number, ω the angular frequency of interest and σ the conductivity of the joint layer material. The solution to this magnetic vector potential is shown in Equation 2 where I1 and K1 represent modified Bessel functions of the first and second kind respectively, µ is the permeability of the joint layer and α, α 1, a, b, and c are resultant from the separation of variables method used to solve Equation 1.

Each excitation system consists of a series of pairs of traces, or unit-cells located at $r_{oi}$ and $z_{oi}$ as indicated in FIG. 6. The magnetic vector potential for each unit cell is calculated according to Equation 2 where the function $f(z, Z_{oi}, \alpha)$ is listed in Equation 10 and Equation 11 for the meandering and additive coil designs respectively. A solution is formed by applying the principle of linear superposition and summing all of the unit cell solutions over the length of z of interest for a given coil layout according to Equation 5. Finally the eddy current density, J(r,z), in the joint layer is found according to Equation 13.

$$\frac{\partial^2 A}{\partial r^2} + \frac{1}{r}\frac{\partial A}{\partial r} - \frac{A}{r^2} + \frac{\partial^2 A}{\partial z^2} = j\omega\sigma A \quad (1)$$

$$A_{oi}(r, z, r_{oi}, z_{io}) = \frac{\mu I r_{oi}}{\pi r_1} \int_0^\infty [aI_1(\alpha_1 r) + bK_1(\alpha_1 r)]\frac{I_1(\alpha r_{oi})}{c} f(z, z_o, \alpha) d\alpha \quad (2)$$

$$\alpha_1^2 = \alpha^2 + j\omega\mu_0\sigma \quad (3)$$

$$c = db - ea \quad (4)$$

$$a = \alpha_1 K_1(\alpha r_2)K_0(\alpha_1 r_2) - \alpha\mu_r K_0(\alpha r_2)K_1(\alpha_1 r_2) \quad (5)$$

$$b = \alpha_1 K_1(\alpha r_2)I_0(\alpha_1 r_2) + \alpha\mu_r K_0(\alpha r_2)I_1(\alpha_1 r_2) \quad (6)$$

$$d = \alpha_1 I_1(\alpha r_1)K_0(\alpha_1 r_1) + \alpha\mu_r I_0(\alpha r_1)K_1(\alpha_1 r_1) \quad (7)$$

$$e = \alpha_1 I_1(\alpha r_1)I_0(\alpha_1 r_1) - \alpha\mu_r I_0(\alpha r_1)I_1(\alpha_1 r_1) \quad (8)$$

$$\mu_r = \frac{\mu}{\mu_0} \quad (9)$$

$$f_{meander}(z, z_o, \alpha) = \frac{2}{\alpha z_1}\sin(\alpha z_o)\sin(\alpha z_1)\sin(\alpha z) \quad (10)$$

$$f_{coil}(z, z_o, \alpha) = \frac{2}{\alpha z_1}\cos(\alpha z_o)\sin(\alpha z_1)\cos(\alpha z) \quad (11)$$

$$A(r, z) = \sum_{i=1}^{Ns} A_{oi}(r, z, r_{oi}, z_o) \quad (12)$$

$$J(r, z) = -j\omega\sigma A(r, z) \quad (13)$$

In addition to these analytical results, a 2-D axi-symmetric finite element code, Ansoft Maxwell 2D, is used to solve for the eddy current density for the different excitation systems of interest. In the case of the additive coil, a trace width of 10 mils is considered with a trace spacing of 30 mils. The underlying layer is offset from the upper layer such as shown in FIG. 6.

In the case of a meandering layout, a trace width of 10 mils and spacing of 10 mils on a single layer is considered.

Figure 7:
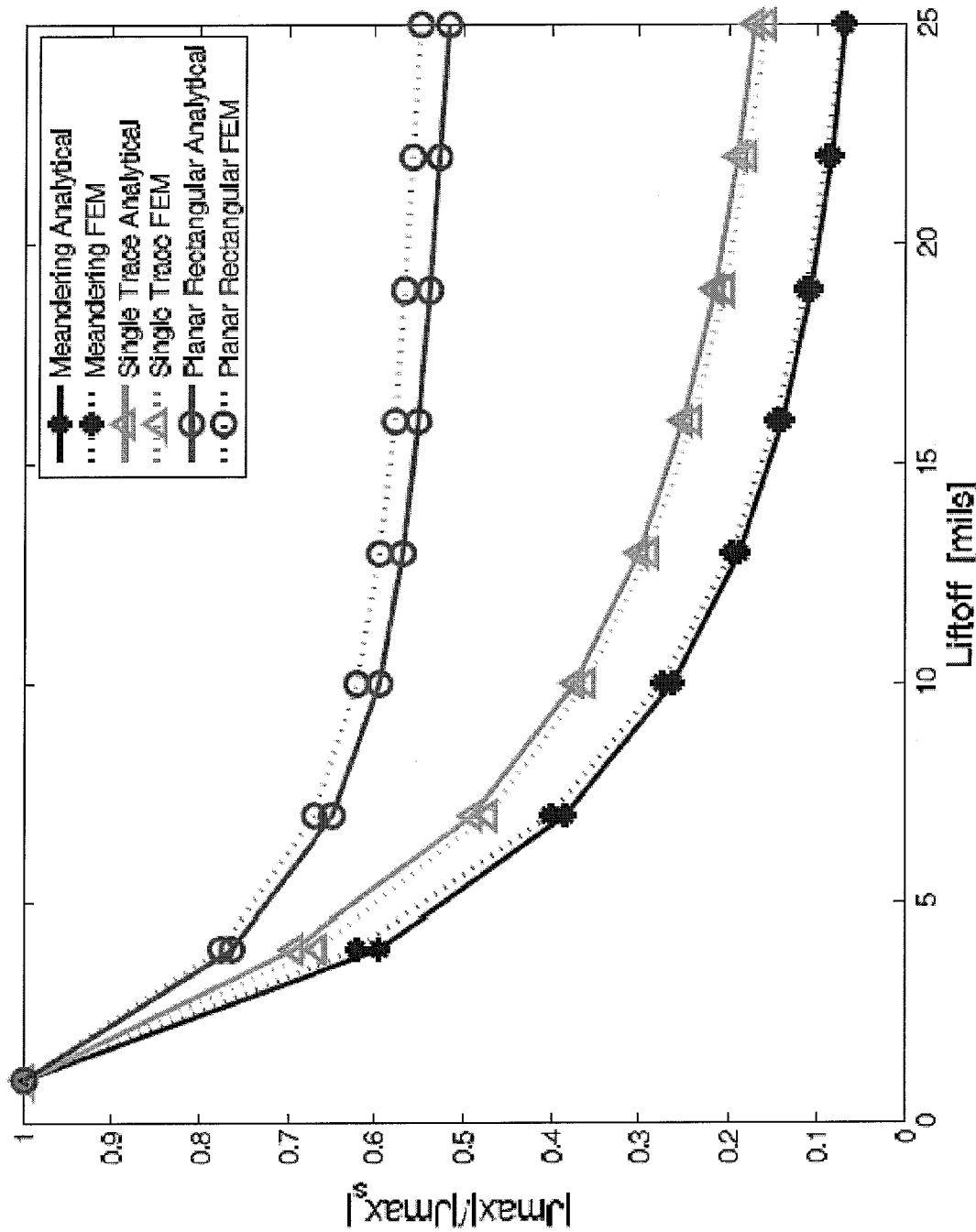
FIG. 7 shows a plot for sensing structural characteristics with liftoff conditions, according to another example embodiment of the present invention.

FIG. 7 shows the decay in strength of induced eddy currents on the surface of a joint layer, or at $r_1$, as the liftoff between the sensor and joint layer are increased. Here |Jmax|/|jmax$_s$| refers to the maximum calculated current density on the surface of the joint layer at r=$r_1$ for a given value of liftoff, scaled by the maximum calculated current density, Jmax$_s$, for the baseline condition of a liftoff equal to 1 mil.

Results are calculated for an excitation frequency of 5 MHz, which corresponds to an eddy current depth of penetration into the joint layer of approximately 1.4 mil. The joint layer material in this case is aluminum, with σ=965200 siemens/in and $\mu_r$=1.000021.

Added to FIG. 7 are results for a single trace. This is considered to be the limiting result for a meandering design, whose response is a function of the spacing between adjacent coil segments. As these traces move far apart, the eddy current density approaches that produced by a single active trace.

As consistent with the results in FIG. 7, the capability to interrogate the adjacent joint layer with liftoff is enhanced in the case of the planar rectangular coil occupying two layers. The decay in eddy current density with liftoff in this case is much less than that of the meandering excitation system. Thus the planar rectangular coil, composed of a high number of turns with current in the same direction leads to an improved capability for inspection of adjacent joint layers with high degrees of separation between sensor and joint layer.

Of interest is the response of these two sensor types to flaws of increasing depth. Therefore, insulating boundaries of a fixed length (l=0.075") and various depths (d=0.005", 0.010", 0.015", 0.020", 0.025", and 0.030") are modeled.

FIG. 9 shows the eddy current fields in the joint layer for each excitation system for three of the six modeled flaw depths (d=0.005", d=0.015", d=0.030"). On the left are contours for the case of the rectangular planar excitation system and on the right are contours for the meandering design. Past a certain depth of flaw, the meandering excitation coil leads to eddy currents that are no longer able to cover the complete depth of the flaw. This is an illustration of sensor saturation, where the sensor is unable to continue to track flaws of increasing size. The depth of penetration of the eddy currents for this meandering design is a function of the spacing between the traces, summarized as the spatial wavelength of the sensor.

Figure 10:
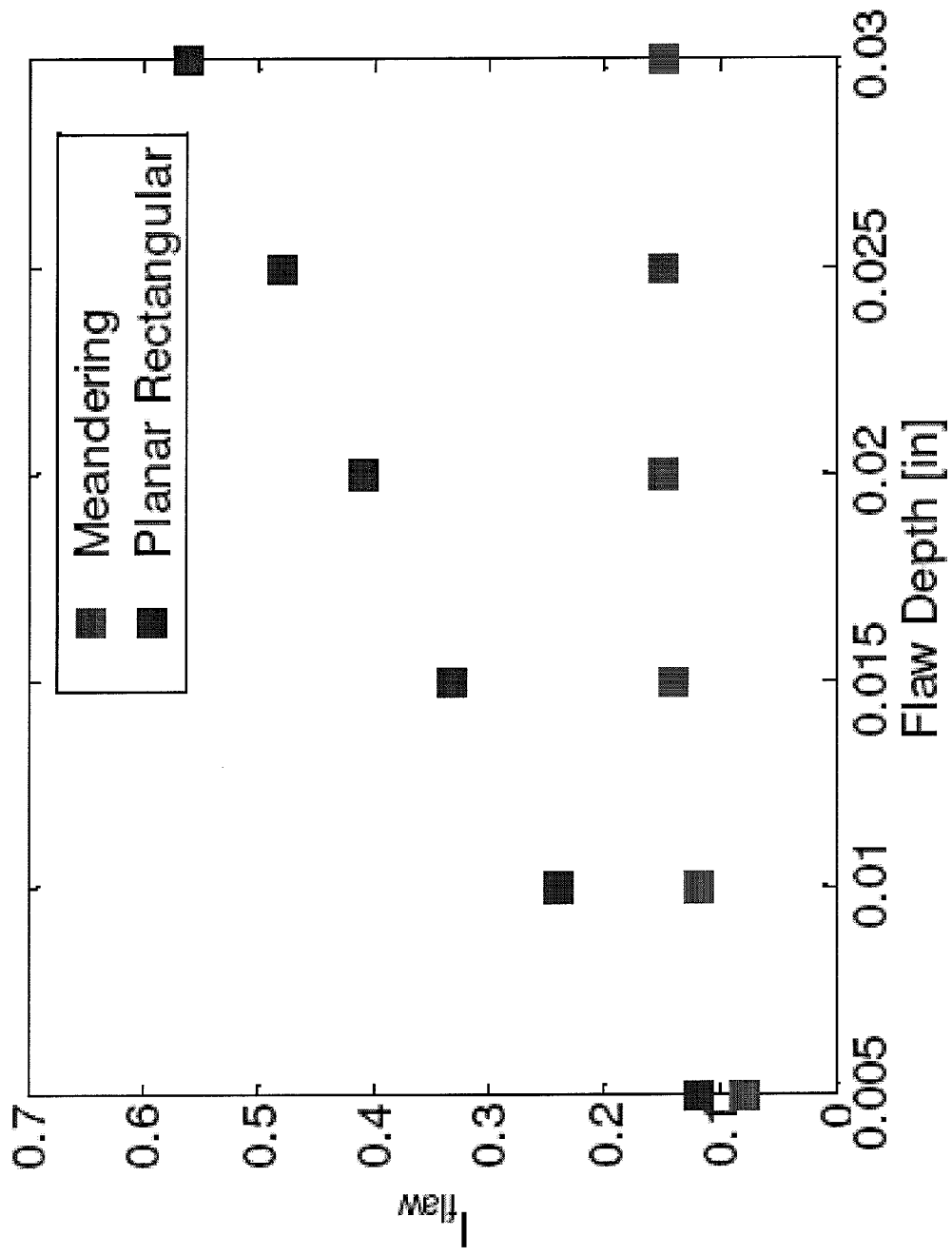
FIG. 10 shows a plot of total current versus flaw depth, according to another example embodiment of the present invention.

To further compare the interaction of the eddy currents produced by the two excitation systems, FIG. 10 shows the total current on the surface of the flaw versus flaw depth. This scalar value was calculated by first integrating the magnitude of the eddy current density vector on the flaw surface according to Equation 14 and calculating the RMS of this time history according to Equation 15.

$$I_{flaw}(t) = \int_{flaw} |\vec{J(t)}| dA_{flaw}$$

$$I_{flaw} = \sqrt{\frac{1}{t_2 - t_1} \int_{t_1}^{t_2} I_{flaw}(t) dt}$$

Equations 14 and 15

As seen in FIG. 10 the total amount of induced current on the flaw surface continues to increase in the case of the planar rectangular coil design, while it flattens, or saturates in the case of the meandering layout.

Numerical Validation

Figure 15:
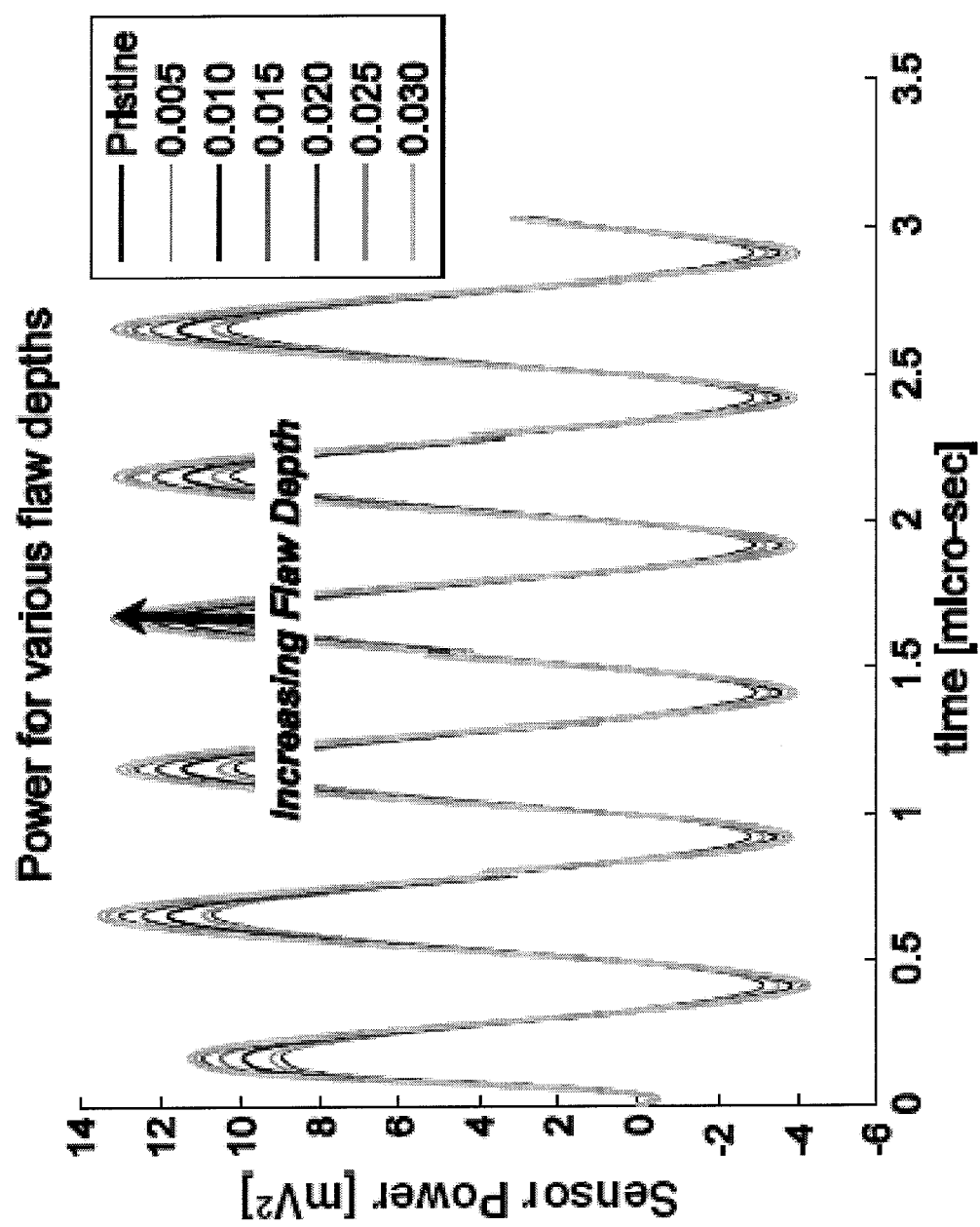
FIG. 15 shows a plot of sensor power versus time, according to another example embodiment of the present invention.
Figure 16:
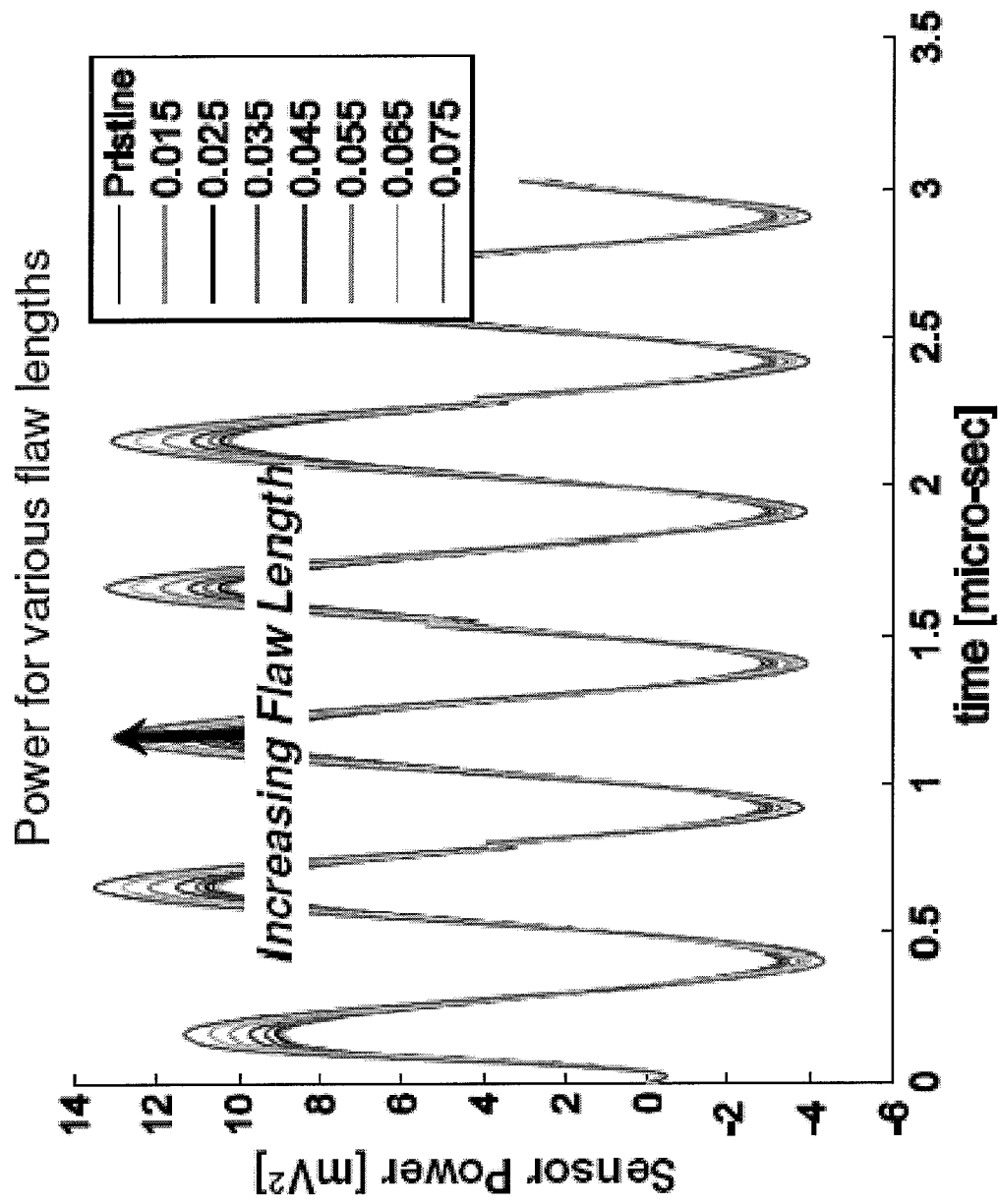
FIG. 16 shows another plot of sensor power versus time, according to another example embodiment of the present invention.
Figure 17:
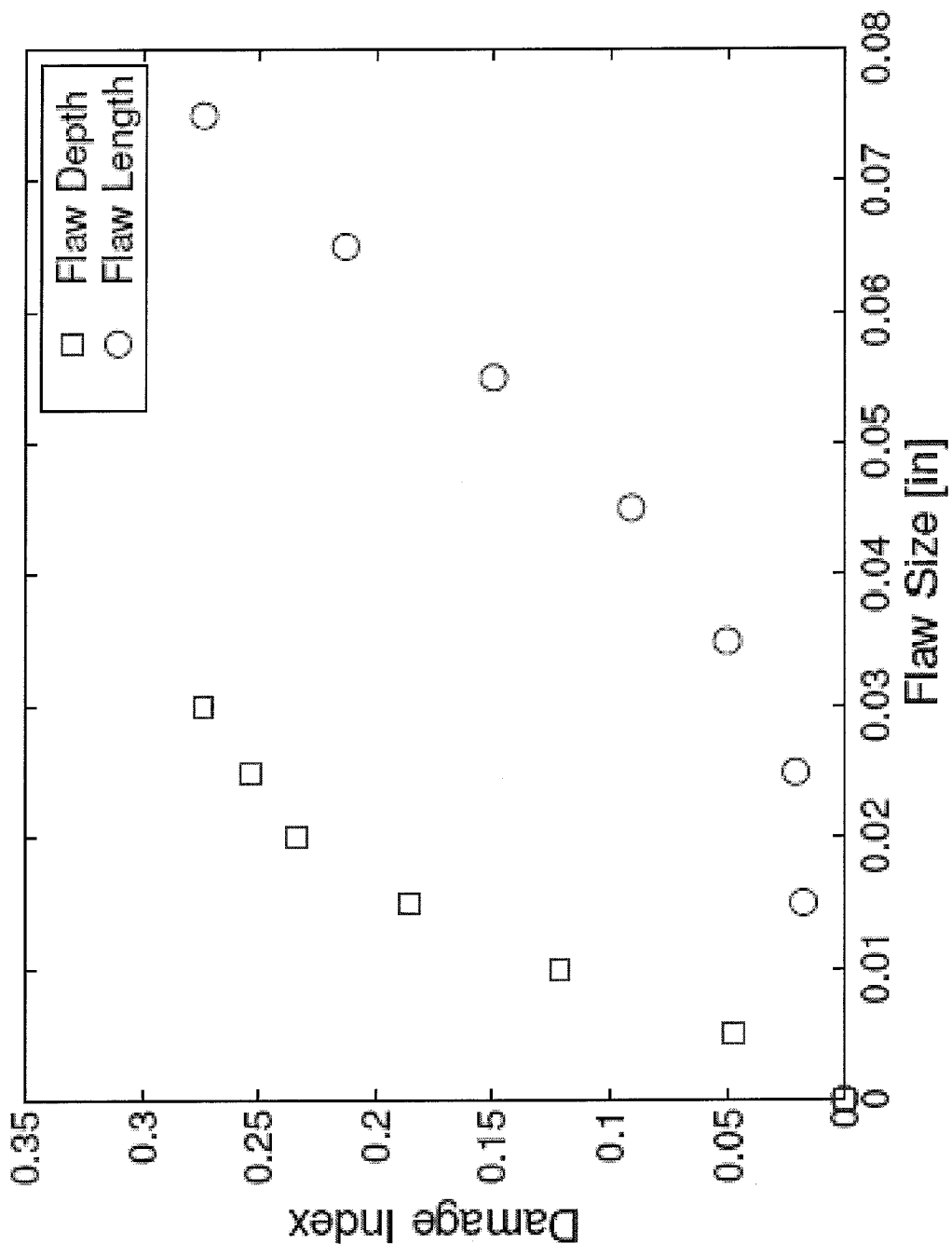
FIG. 17 shows a plot of damage index and flaw depth, according to another example embodiment of the present invention.

The 3D finite element model shown in FIG. 8 for the planar rectangular excitation system and modeled flaw is used to validate the damage index response to increasing flaw size both in width and in depth. To study the response of the sensor to increasing crack depth, the length of the insulating boundary on the flaw plane is held fixed in the model while the depth of the insulating boundary was increased. Similarly, with the depth of the insulating boundary held fixed, the length of the insulating boundary is increased. Then for each of these flaw sizes, the product of the voltages on the active and passive traces is calculated. The product of the two forms the sensor power and this value is plotted below in FIGS. 15 and 16 for the case of increasing flaw depth and increasing flaw length respectively. The damage index, calculated from these signals is shown in FIG. 17. There is a clear response to flaw growth both in length and in depth in this case.

Benchtop Validation

Figure 18:
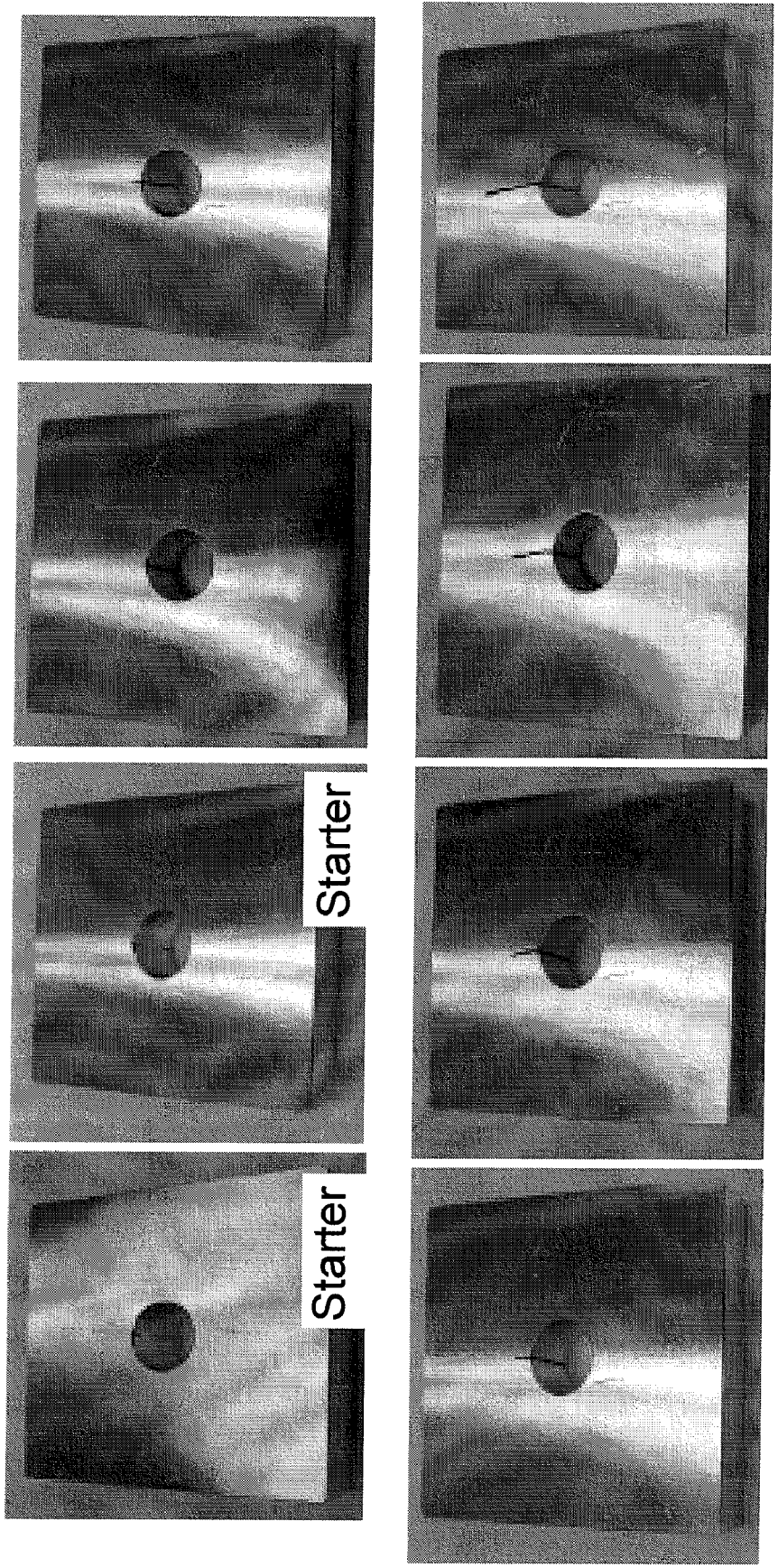
FIG. 18 shows approaches for crack detection, according to another example embodiment of the present invention.

A bench-top demonstration of crack detection is carried out by making fine cuts into an Al 6061-T6 plate (FIG. 18) into which the sensor fastener system was installed in slip-fit. The crack lengths are (first two slot sizes are triangular starter cuts) [0.010"×0.025", 0.045"×0.030", 0.040", 0.065", 0.090", 0.10", 0.17", 0.20", 0.292", 0.395", 0.585"]. The slot width for each cut is approximately 0.008".

Figure 19:
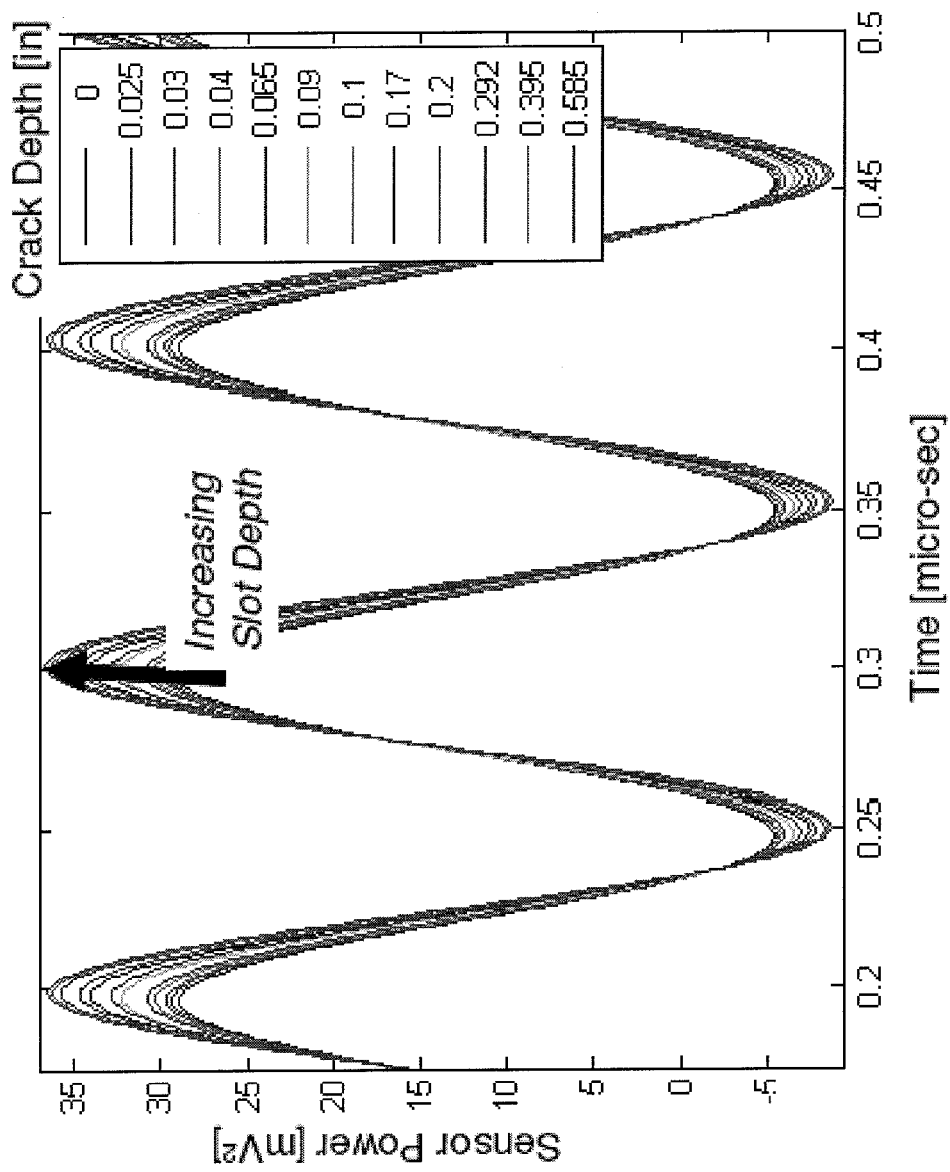
FIG. 19 shows a plot of sensor power versus time, according to another example embodiment of the present invention.
Figure 20:
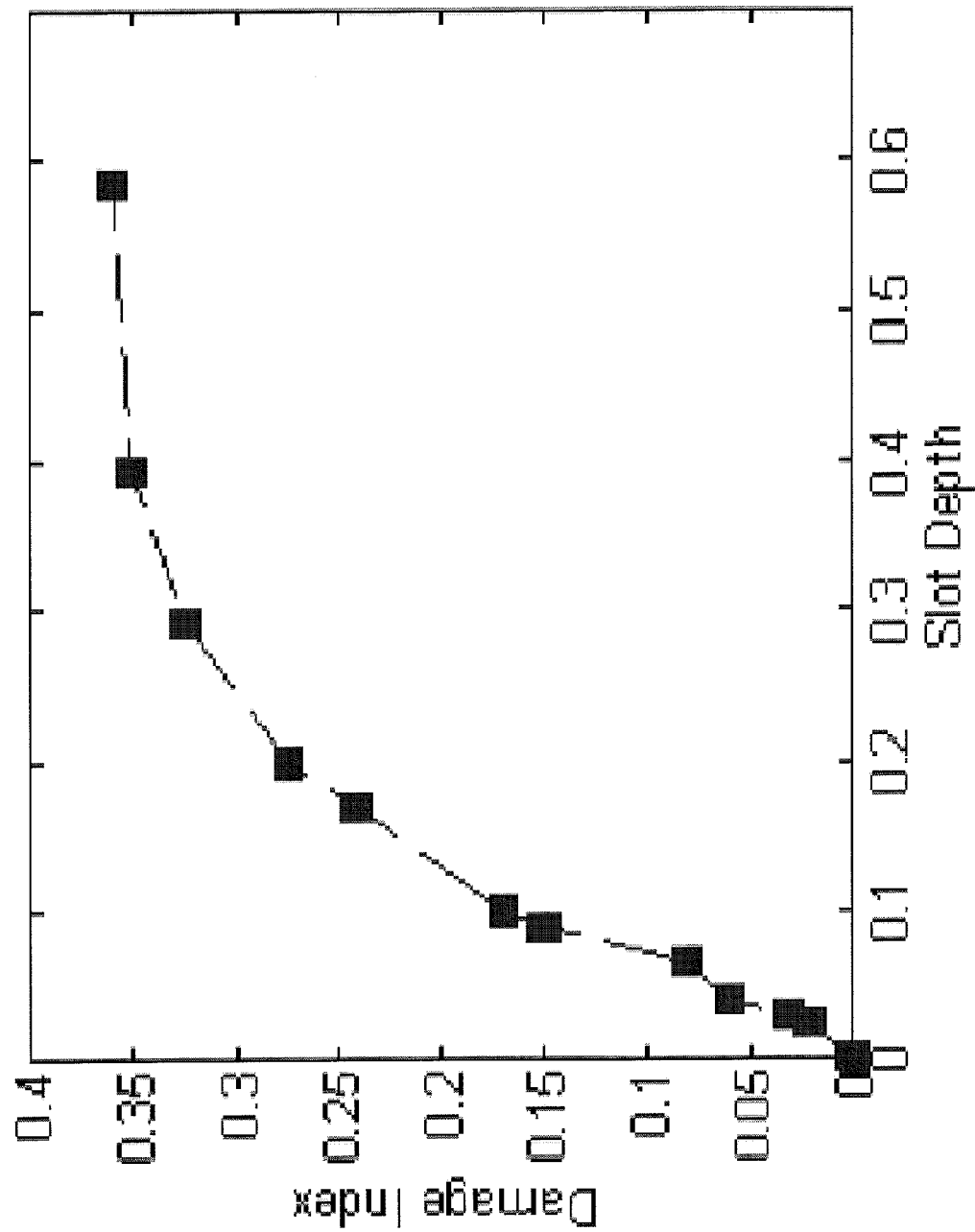
FIG. 20 shows a plot of damage index and crack depth, according to another example embodiment of the present invention.

Time histories of sensor measurements taken for each plate condition are shown in FIG. 19. Here the resulting increase in the sensor power is evident with increasing crack size. The corresponding damage index calculated according to Equation 17 is shown versus flaw size in FIG. 20. There is a good correlation in trend between the sensor power signals obtained from the FEM and the signals obtained experimentally in the bench top experiment.

Experimental Test Progression

Figure 21:
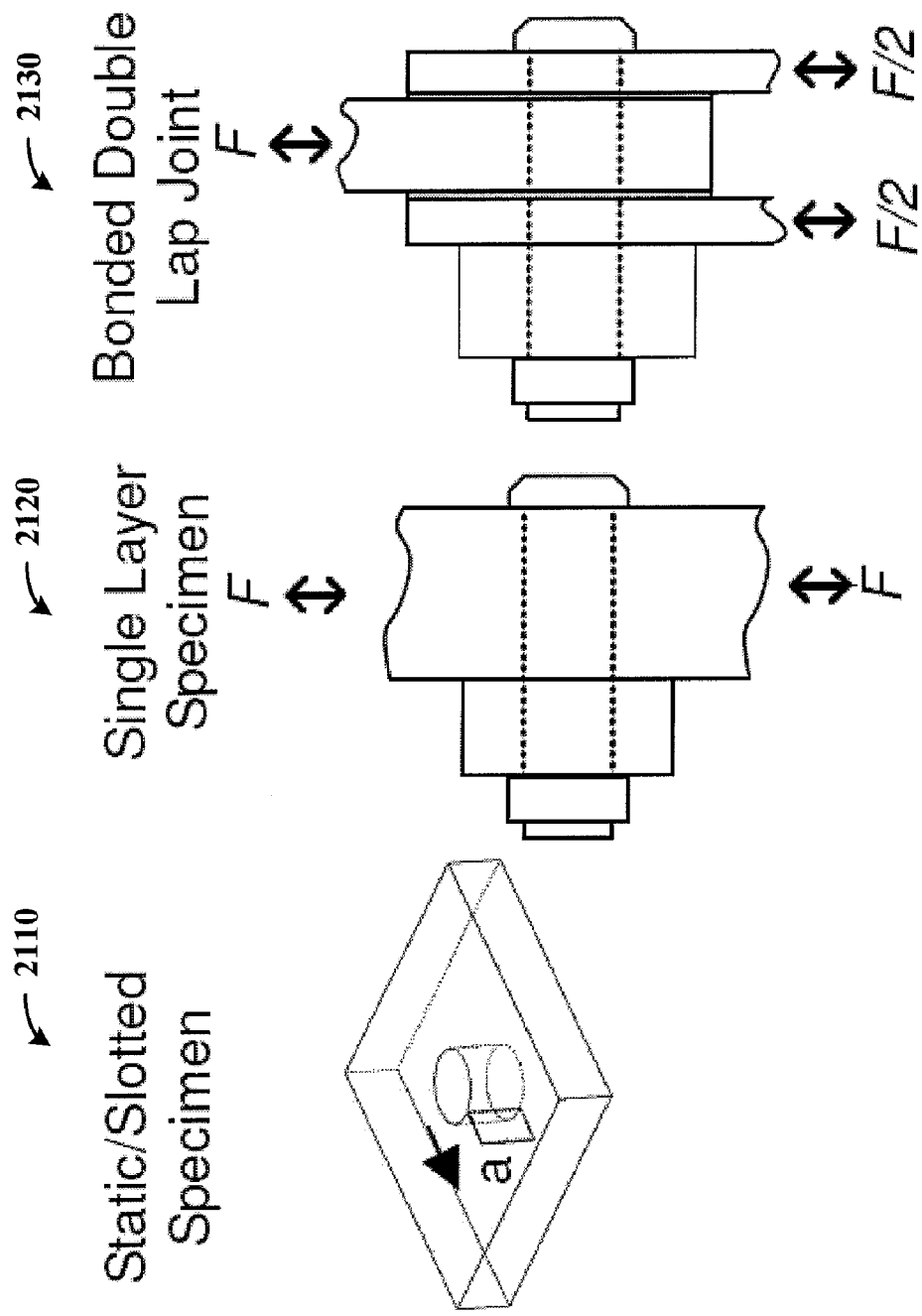
FIG. 21 shows an approach to detecting characteristics of a specimen, according to another example embodiment of the present invention.

FIG. 21 shows the progression of tests performed to validate the SHM fastener. Each of a slotted, single layer static bench-top specimen 2110, single layer fatigue specimen 2120 and a double lap-joint fatigue specimen 2130 are tested.

Single Layer Specimen #1

Figure 22:
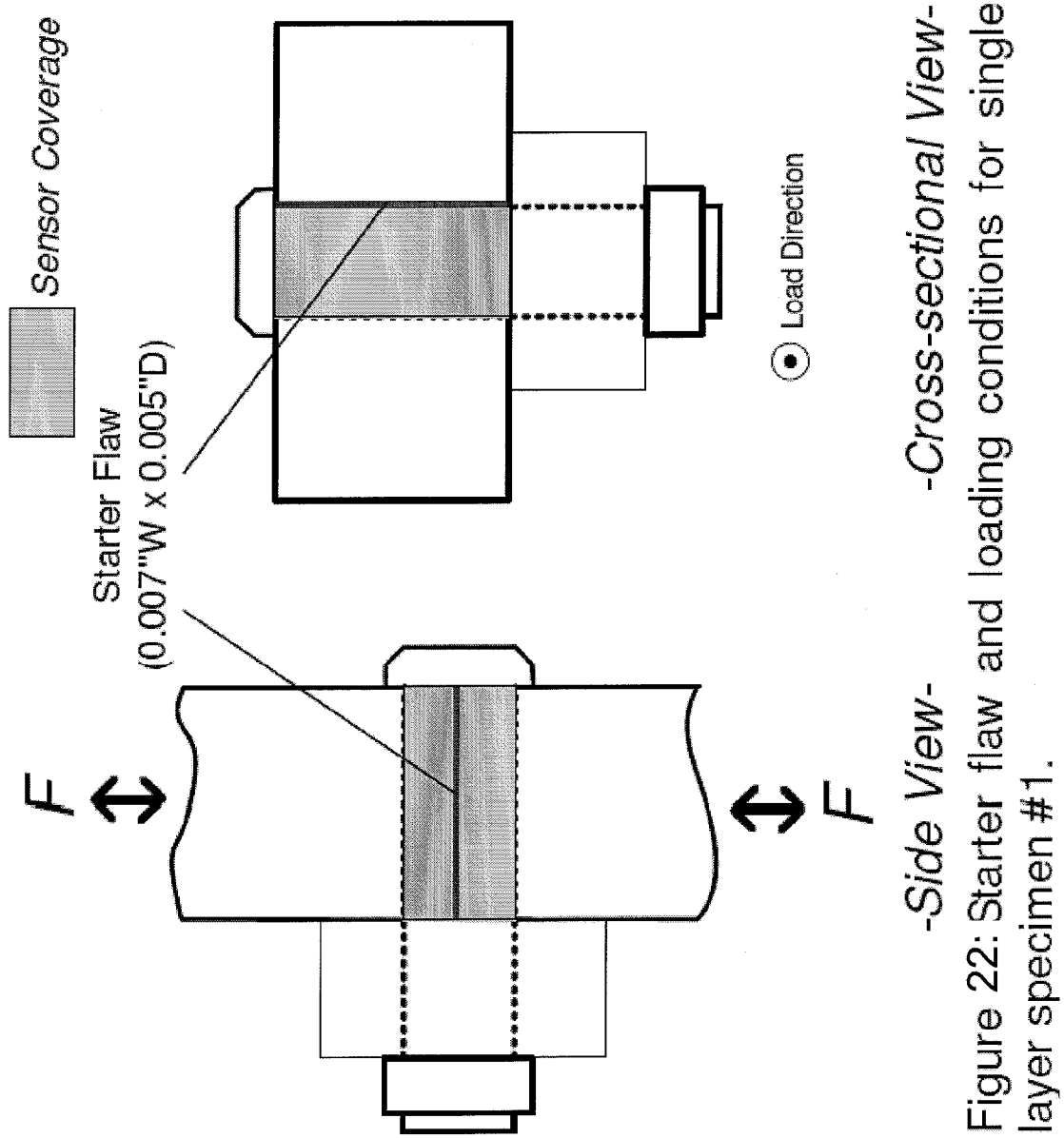
FIG. 22 shows an approach to detecting characteristics of a specimen, according to another example embodiment of the present invention.

Fatigue specimen number 2120 is made from a C433-T351 aluminum alloy. The specimen geometry is shown in FIG. 22. The single layer specimen is 0.75" thick, with a width of 2" and length of 10". The sensor spans 0.75", the thickness of the specimen along the fastener shank. A spacer block is placed on the backside of the specimen to take up the extra fastener grip length.

The specimen is cycled at constant amplitude between 0 and 17.7 Kip on an MTS 810 load frame in laboratory air. The thru-hole diameter in this case was 0.550", while the outer diameter of the SHM Fastener was 0.545", resulting in a considerable degree of lift-off between the sensor and the joint layer in this case.

FIG. 22 shows the cross-section of the specimen and details of a starter flaw that is placed on the thru-hole boundary. A complete thrucut of 0.005" in depth and 0.007" in width from the thru-hole boundary is placed in the single layer, forcing a crack to form on that side.

Measurements of the damage index are taken incrementally during testing of this specimen (see, e.g., Rakow, A, F. K. Chang (In Submission) "A Structural Health Monitoring Fastener for Tracking Fatigue Crack Growth in Bolted Metallic Joints. I. Sensor Design and Integration" *Structural Health Monitoring, An International Journal*. The specimen is cycled and then the test machine was stopped at regular intervals (approximately every 2000 cycles) and held at the maximum tensile load while a measurement of the damage index is acquired.

Figure 23:
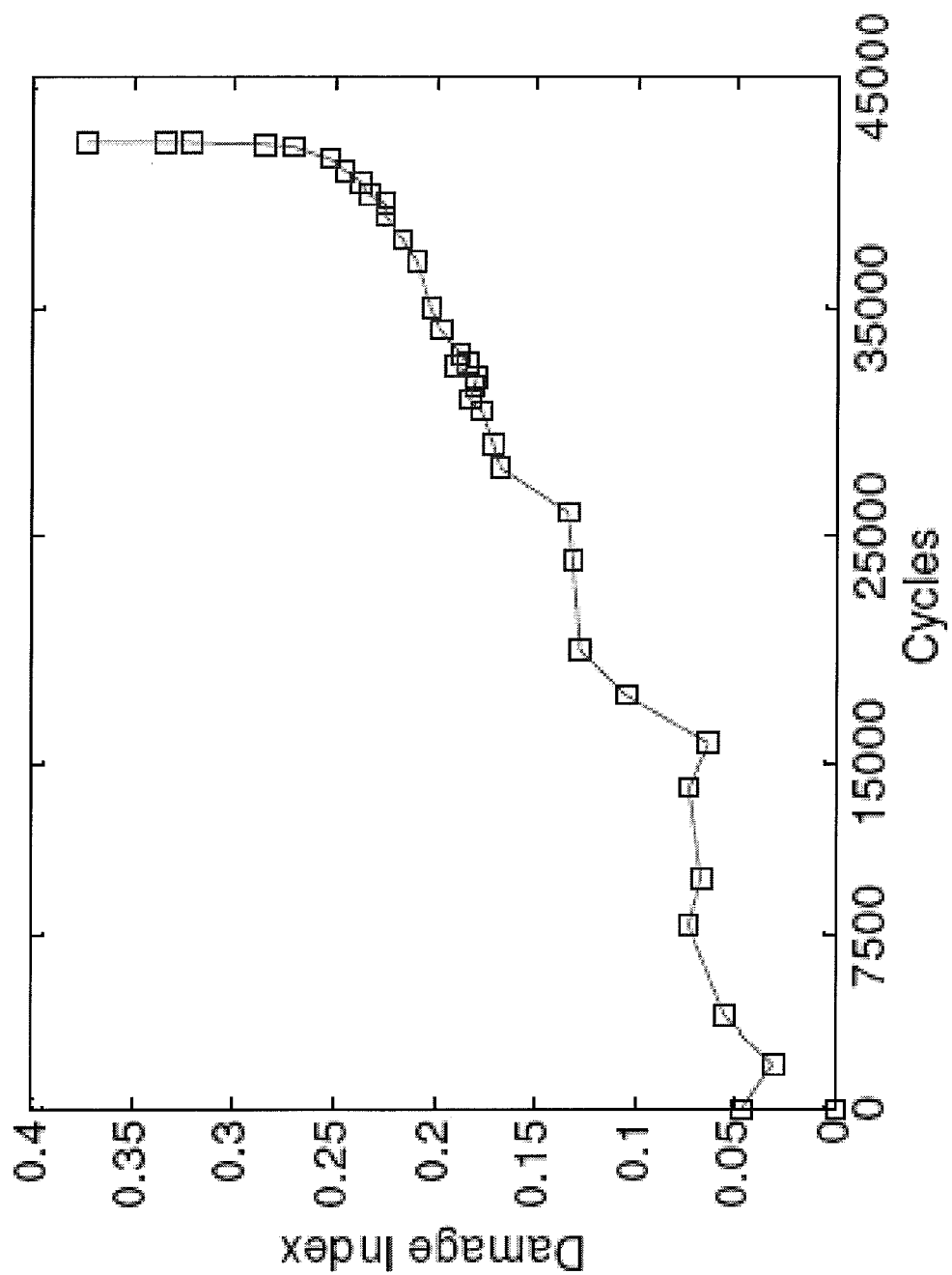
FIG. 23 shows a plot of damage versus cycles, according to another example embodiment of the present invention.

The incrementally measured damage index is shown in FIG. 23. The specimen is cycled until ultimate failure, with the damage index continuing to track the increase in flaw size out to over 0.7" in this aluminum specimen.

Single Layer Specimen #2

Figure 24:
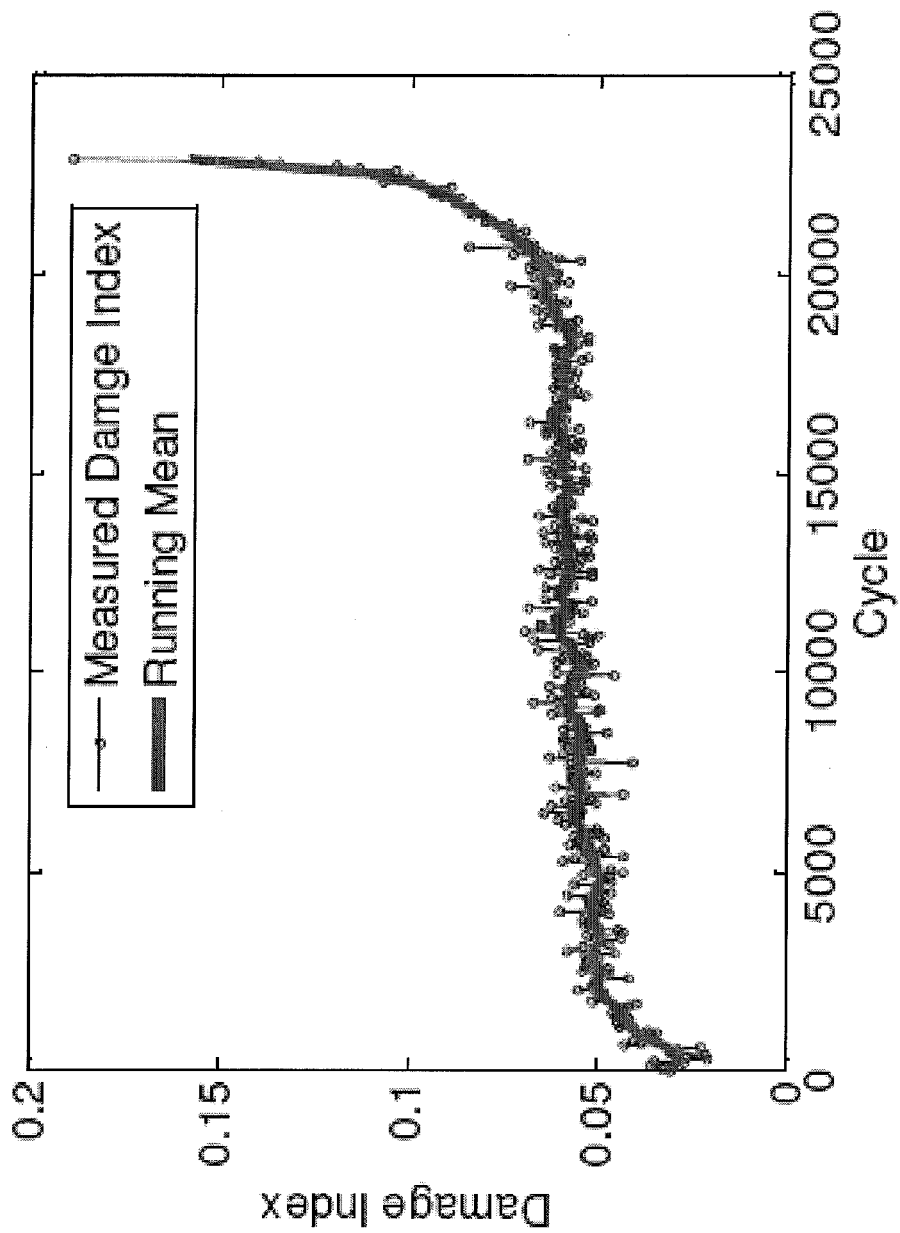
FIG. 24 shows another plot of damage versus cycles, according to another example embodiment of the present invention.

A second single-layer specimen is tested with no starter flaw placed in the thru-hole. The specimen is cycled at relatively higher, constant amplitude load levels, between −8.4 and 34.8Kip at a frequency of 20 Hz. FIG. 24 shows the damage index obtained from this sensor. For this specimen the sensor is operated in a continuous, autonomous mode. In this mode, after a baseline measurement of sensor signals is acquired at the beginning of life of the specimen, the system is cycled to acquire sensor signals constantly at a rate of 0.17 Hz as the specimen is cycled in the test machine.

As shown in FIG. 24 there is variability in the damage index as the measurements are taken in this continuous mode. This is a result of mechanical effects, or displacements taking place in the specimen as it is being loaded and measurements are taken continuously. This aspect of sensor response is discussed in more detail below.

A running mean of the continuously acquired data is shown in FIG. 24. This running mean is defined according to the following equation, where the sample window, M, is 50 measurements and DI is the continuously acquired damage index.

$$RunningMean(i) = \frac{\sum_{j=i-M}^{i+M} DI(j)}{2M+1}$$

Mechanical Effects and Signal Variability

To quantify the sensor response to mechanical loads, a double-lap joint specimen (FIG. 25) is cycled at a low rate of 0.01 Hz with constant amplitude loads varying between 0 and 12 Kip while the damage index was acquired continuously. The double-lap joint specimen includes 0.1875" thick outer layer plates of C433-T351 aluminum bonded to the inner, 0.375" thick plate of C433-T351 with 0.005" thick FM-73 aircraft grade film adhesive. The sensor sleeve spans 0.75", or the layers of the double-lap joint along the fastener shank. The additional grip-length of the fastener is taken up by an additional spacer plate on the backside of the specimen.

Figure 26:
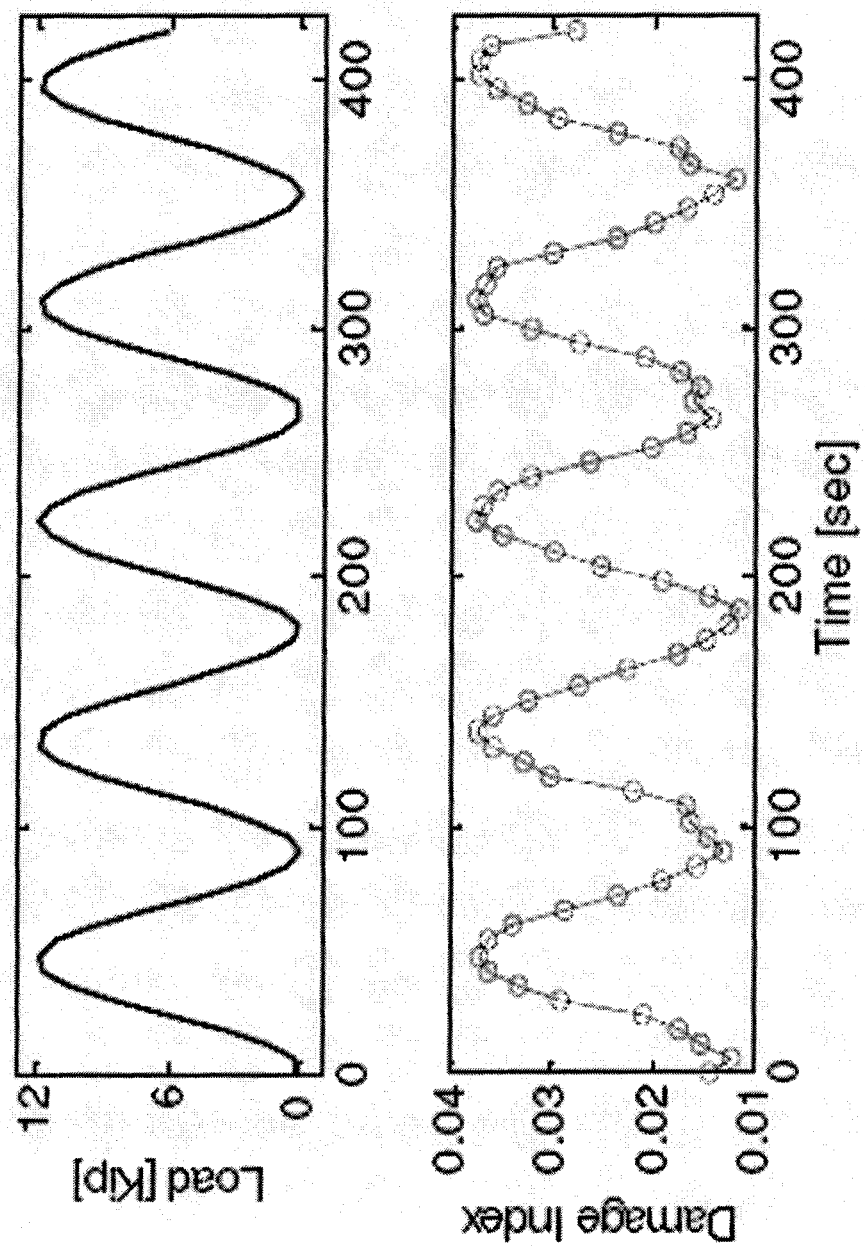
FIG. 26 shows a plot of sensor response and loading, according to another example embodiment of the present invention.

The sensor response to the loads across the joint are shown in FIG. 26. There is a clear response to the loading of the joint in the damage index produced from sensor signals. The running mean of continuously obtained sensor signals provides a means to average out these loading effects.

Fatigue Life of Single Layer Specimens

To further characterize increases in damage index versus cycle number, a prediction for fatigue crack growth is made using AFGROW, a fatigue prediction software produced by the USAF. Details about this analytical software can be found in USAF, "AFGROW User's Guide and Technical Manual" available from the U.S. Air Force (AFGROW is the Air Force's Crack Growth Analysis tool).

Fatigue crack growth data obtained for the C433-T351 alloy used in this specimen is input for two different R values, 0.1 and 0.5. The Harter-T, point-by-point method is used to extrapolate these tabular fatigue crack growth data to different R values as detailed in the AFGROW reference cited above.

Figure 27:
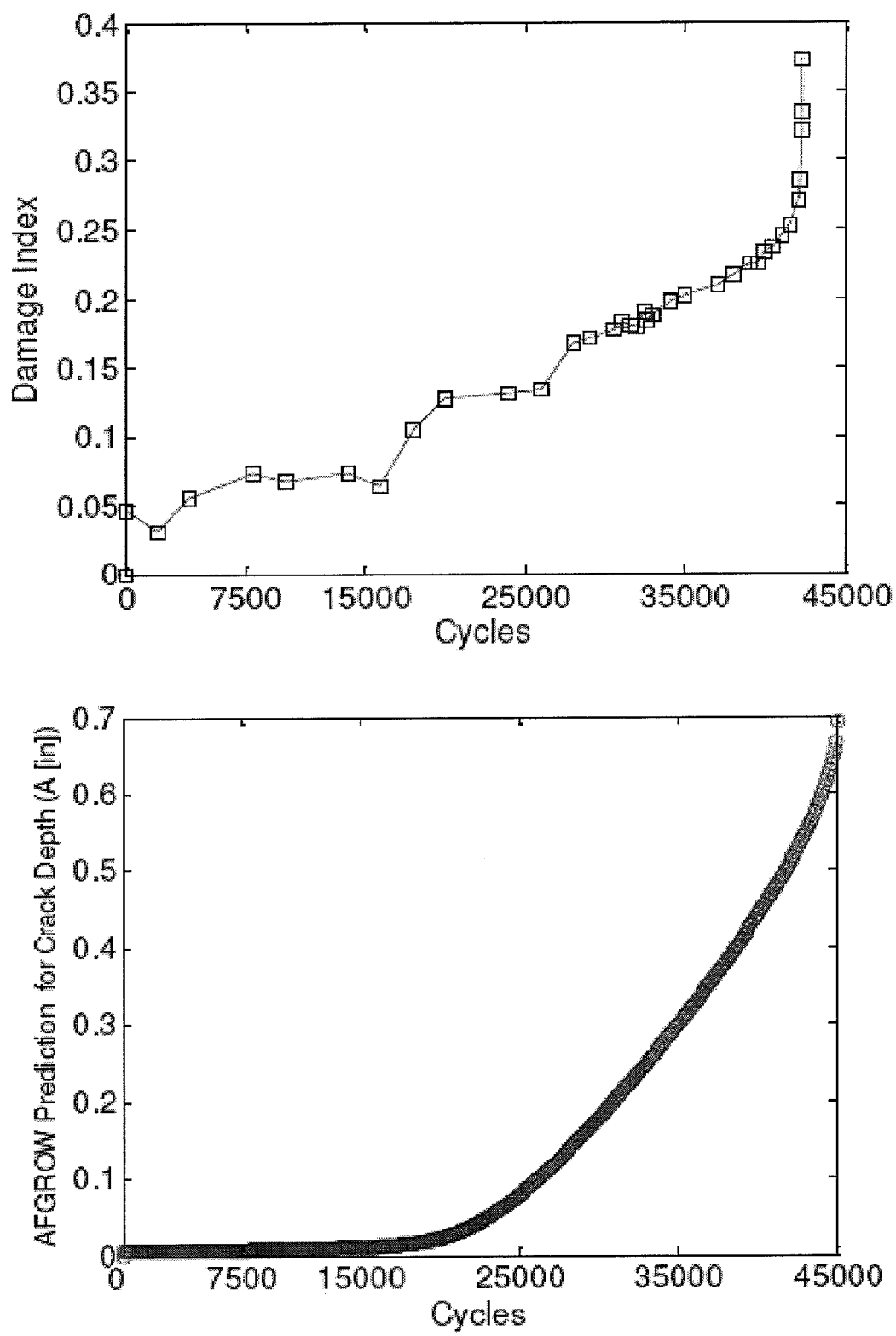
FIG. 27 shows a plot of damage versus cycles, according to another example embodiment of the present invention.

In FIG. 27, the experimentally obtained damage index for single layer specimen #1 is shown above and below is plotted the prediction from AFGROW for this specimen. The starter flaw conditions shown in FIG. 22 are input into AFGROW along with the constant amplitude load spectrum.

The correlation between the increase in the damage index measured and the increase in predicted crack depth is used to indicate that the increase in damage index is indeed due to increases in the crack size in this specimen.

Figure 28:
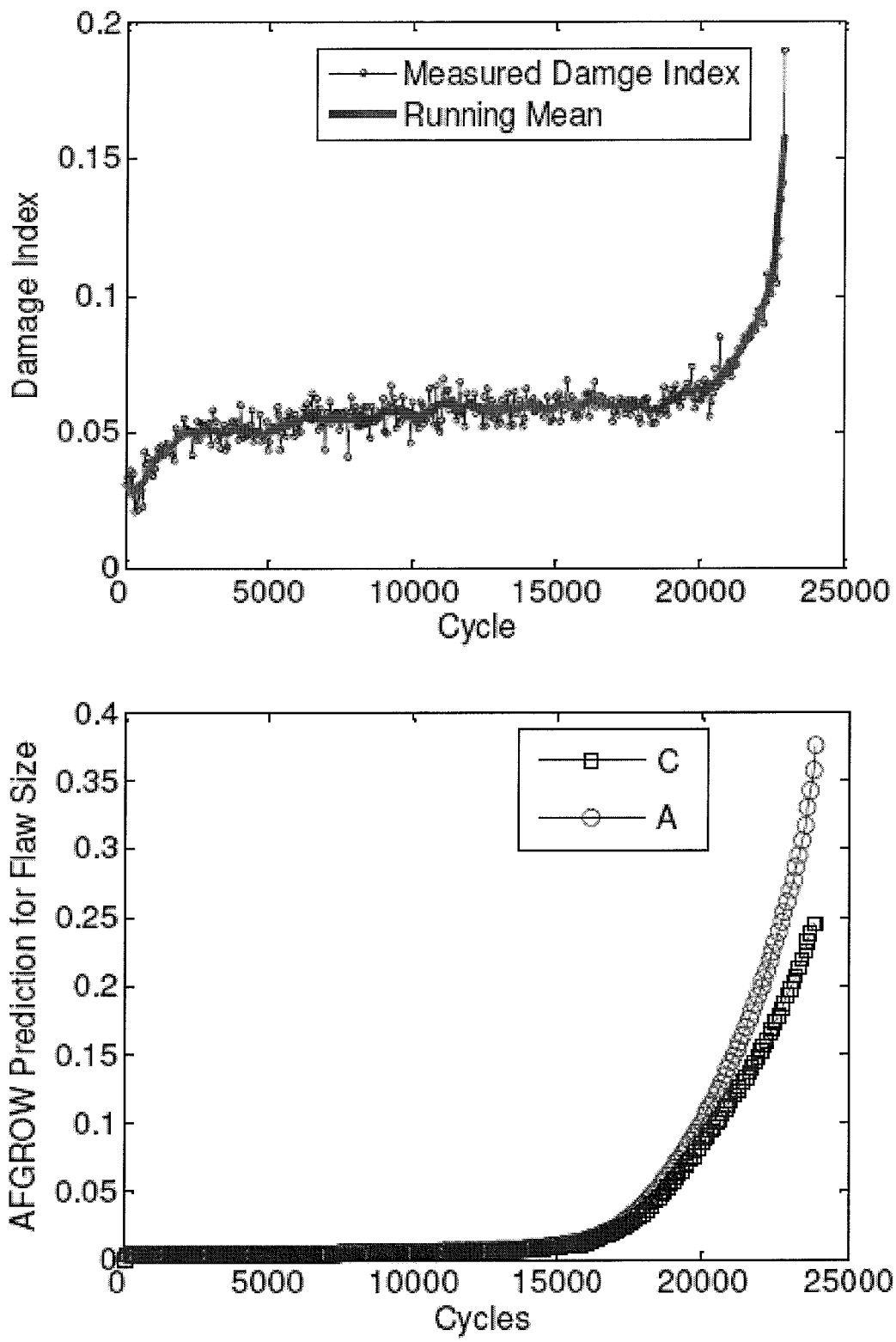
FIG. 28 shows a plot of damage versus cycles, according to another example embodiment of the present invention.

FIG. 28 shows a damage index and corresponding prediction from AFGROW for increases in flaw size in both A and C directions, or in depth and length for single layer specimen #2. In the case of this specimen, where no starter flaw was present, a starter flaw at the thru-hole boundary is assumed. In this prediction a double-surface crack at thru-hole condition is used with dimensions of 0.0025"×0.0025" for the starter flaw. These are the smallest starter flaw conditions possible in order to get appreciable crack growth required for AFGROW to make a prediction.

Bonded Double-Lap Joint

Figure 29:
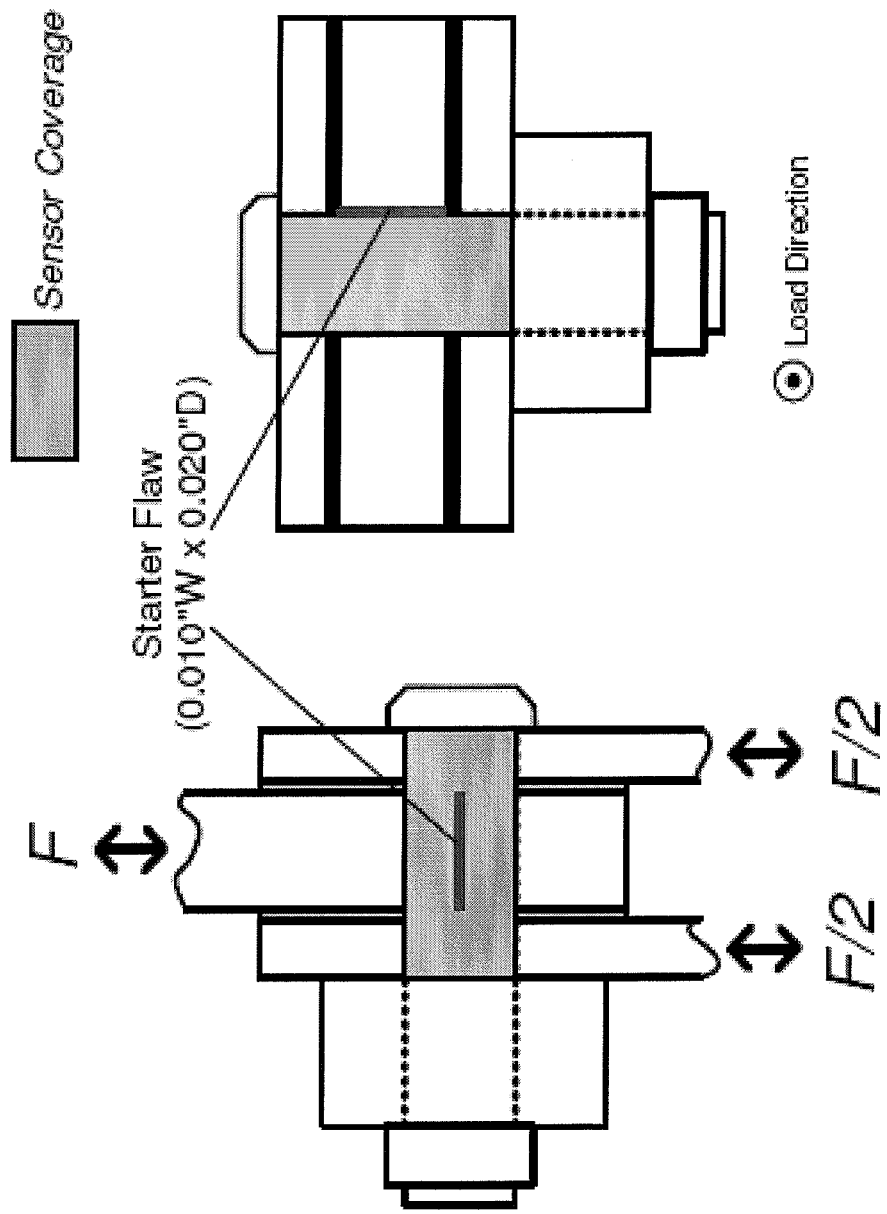
FIG. 29 shows an approach to detecting characteristics of a structure, according to another example embodiment of the present invention.

To test the capability of the SHM fastener to detect and track cracks occurring on the inner layer of a multi-layer specimen, a double-lap joint shown in FIG. 29 is tested, by first placing a starter flaw on the inner most layer in the stack-up as shown. The starter flaw has a width of 0.010" and is cut at a depth from the thru-hole boundary on the inner joint layer of 0.020". The specimen was cycled between 0 and 12Kip at a frequency of 3 Hz. Sensor signals were acquired in a continuous, autonomous mode at a rate of 0.11 Hz.

Figure 30:
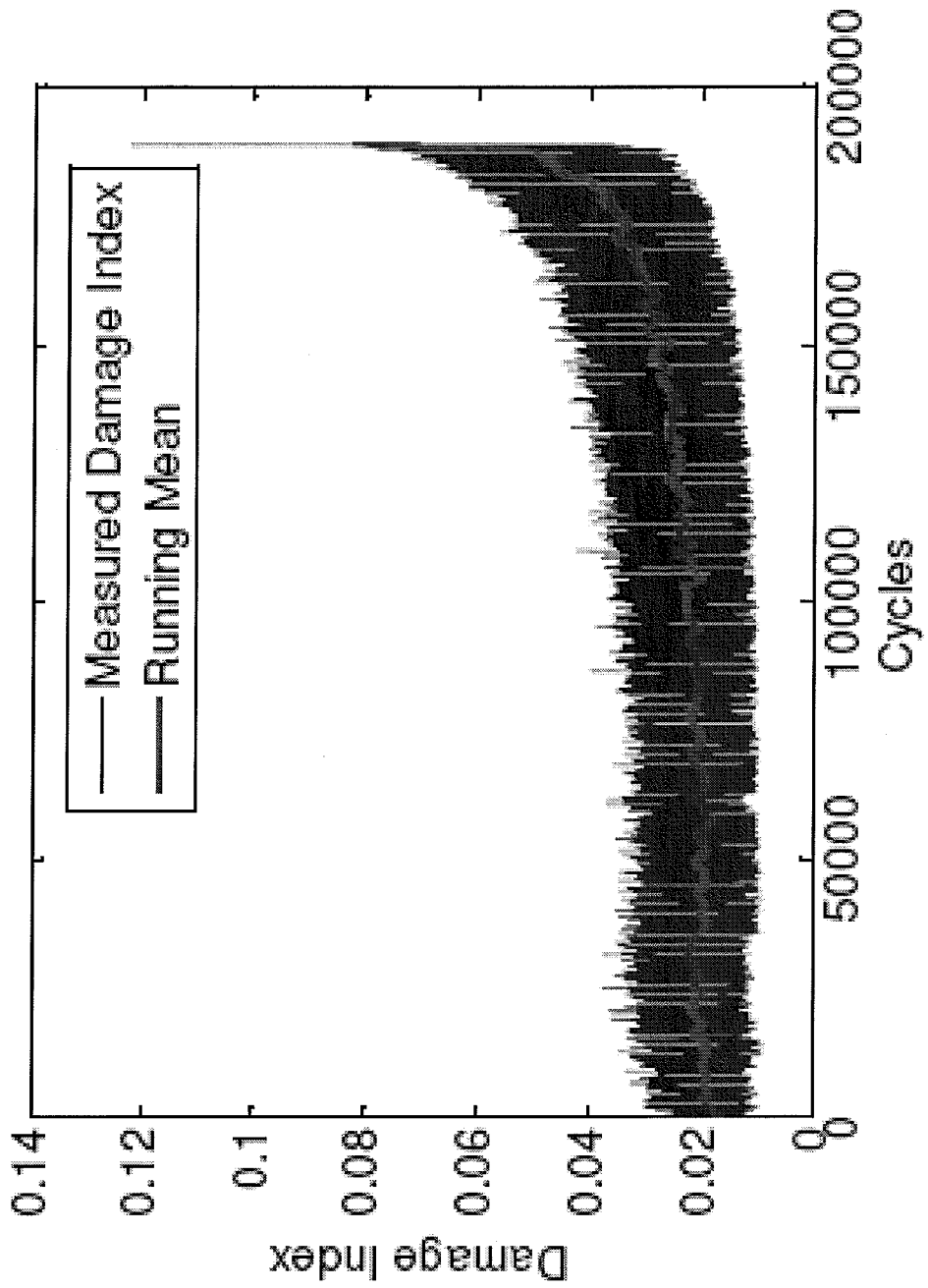
FIG. 30 shows a plot of damage versus cycles, according to another example embodiment of the present invention.

FIG. 30 shows continuously measured damage index and running mean for the specimen. The specimen is cycled until ultimate failure, which included a crack out to the edge of the specimen on the inner layer, propagated from the starter flaw shown in FIG. 29.

In connection with the above experimental embodiments, it has been found that an SHM fastener system as described herein is capable of tracking cracks out to over 0.7" in depth from a thru-hole boundary in a series of single and multi-layer fatigue specimens, and can successfully detect and track a fatigue crack forming on the inner joint layer of an adhesively bonded double-lap joint. The trend in damage index versus cycle number obtained experimentally is well matched by fatigue crack growth predictions made with AFGROW for single layer specimens. The SHM fastener can be utilized both in an incremental mode and in a continuous, autonomous mode to obtain damage index values versus cycle number.

Other embodiments involve enhancing the durability long-term and survivability of sensor materials to withstand mechanical loading, moisture, and corrosion present in a bolted joint environment.

Durability

Figure 25:
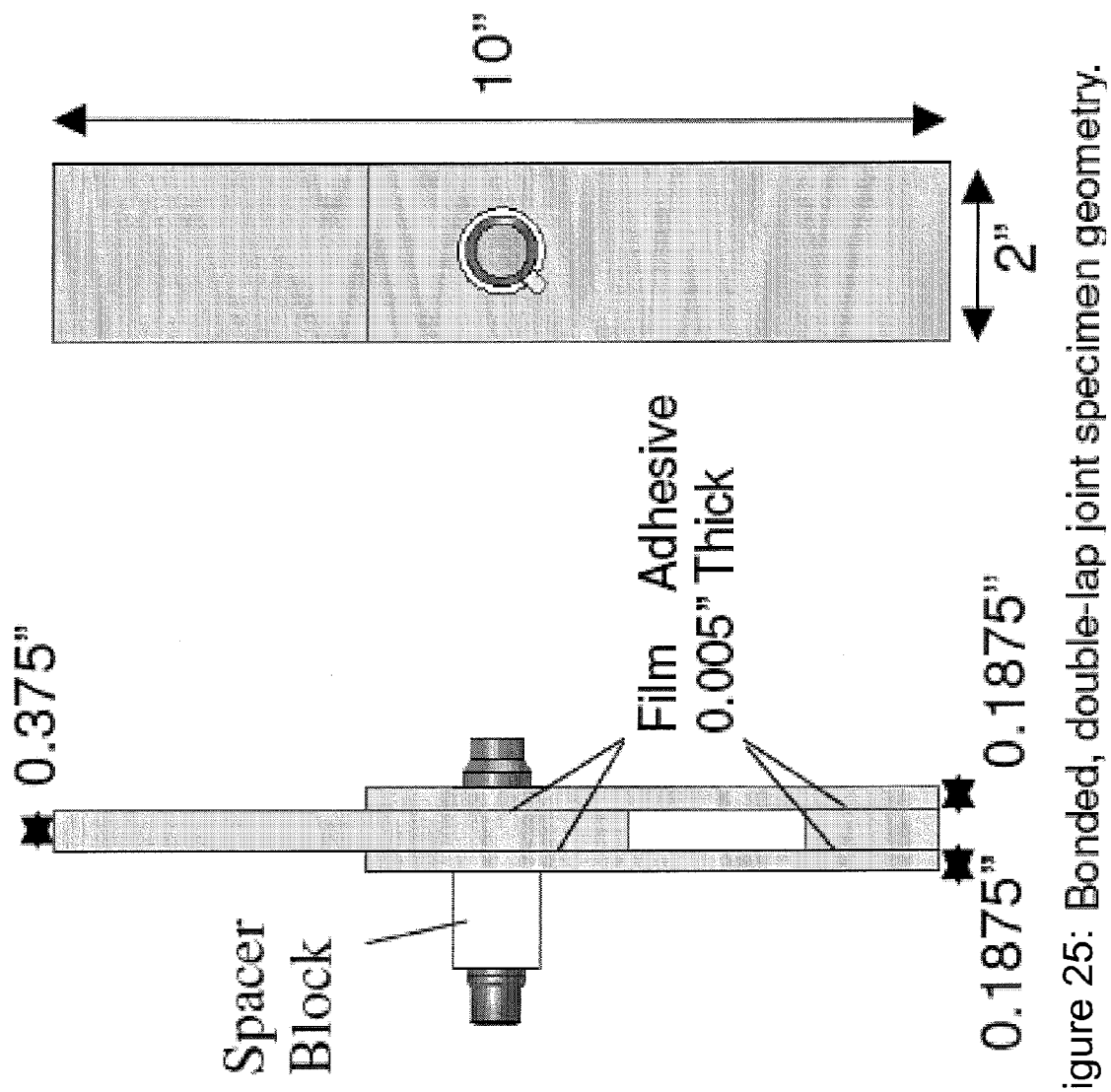
FIG. 25 shows an approach to detecting characteristics of a structure, according to another example embodiment of the present invention.

In connection with other experimental embodiments, a test for durability is performed on a coated bolt prototype. The prototype is inserted in an un-bonded double lap-joint specimen, with outer dimensions such as shown in FIG. 25. The hole diameter on all layers is adjusted to result in a neat fit of the fastener shank; a diameter of 0.520 inches. A fatigue nut is used to tighten the grip of the fastener and was made hand tight.

Prior to testing, the conductivity of a single copper trace in the prototype bolt is measured from the runout on the fastener head down to the exposed area at the bottom of the fastener shank (e.g., with a value of 71 ohms).

The double lap-joint specimen is then cycled with constant amplitude loads up to 21.3 ksi with an R-ratio of −0.375 (example worst case flight loads as determined by Alcoa). The loads are applied at a rate of 0.1 Hz on an MTS 810 loadframe. Testing results in large bearing deformation around the hole in the aluminum double lap-joint layers and subsequent slipping and displacements of the entire joint. Testing is halted after 50 cycles.

REFERENCES

Various example embodiments are directed to applications involving an integrated fastener/sensor type arrangement as described herein, as implemented in connection with and/or using one or more of the approaches and systems as described in the following references, which are fully incorporated herein by reference.

1. Staszewski, W. J. 2000. "Monitoring On-line Integrated Technologies for Operational Reliability—MONITOR," *Air and Space Europe*, Vol. 2, No. 4, pp. 189-206.
2. Boller, C. (2001) "Ways and Options for Aircraft Structural Health Management," *Smart Materials and Structures*, Vol. 10, pp. 432-440.
3. Campbell G. S., R. Lahery (1984) A survey of serious aircraft accidents involving fatigue, *Int. J. Fatigue*, Vol. 6, No. 1 (January 1984).
4. J. E. Michaels, T. E. Michaels, B. Mi, A. C. Cobb, D. M Stobbe, (2005) Self-calibrating ultrasonic methods for in-situ monitoring of fatigue crack progression. *Review of Progress in Quantitatine Nondestructive Evaluation. American Institute of Physics*, New York, Vol. 24B, pp. 1765-1772.

5. J.-B Ihn, F-K Chang (2003) "Monitoring Fatigue Crack Growth using a Pair of Piezoelectric Actuator/sensor: Part I. Diagnostics", *Smart Materials and Structures*, 2003.
6. Giurgiutiu V., J. J. Bao, (2002) Embedded-Ultrasonics Structural Radar for Nondestructive Evaluation of Thin-wall Structures. *Proceedings of IMECE* 2002, Nov. 17-22, 2002, New Orleans, La.
7. Vladimir Zilberstein, Karen Walrath, Dave Grundy, Darrell Schlicker, Neil Goldfine, Eugen Abramovici and Tom Yentzer, "MWM eddycurrent arrays for crack initiation and growth monitoring," *International Journal of Fatigue*, Volume 25, Issues 9-11.
8. Crouch, A. E., T. Goyen, P. Porter, (2004) New Method Uses Conformable Array to Map External Pipeline Corrosion. *Oil Gas J.* 102 (41) pp. 55-59.
9. Yamada, S.; Katou, M.; Iwahara, M.; Dawson, F. P., (1995) Eddy current testing probe composed of planar coils" *Magnetics, IEEE Transactions on*, vol. 31, no. 6, pp. 3185-3187
10. Fava J., M. Ruch, A. E. Obrutsky, Design and Construction of Eddy Current Sensors with Rectangular Planar Coils (2004). *Non-Destructive Testing and Condition Monitoring*. Vol 46, Issue 5, pp. 268-274.
11. Placko, D.; Dufour, I., (1992) Eddy current sensors for nondestructive inspection of graphite composite materials. *Industry Applications Society Annual Meeting*, 1992., *Conference Record of the* 1992 *IEEE*, vol., no., pp. 1676-1682 vol. 2, 4-9 Oct. 1992
12. Hagemaier, D. J. (1983) Eddy Current Impedance Plane Analysis. *Materials Evaluation*, Vol 41, pp. 211-218.
13. Dodd C. V., Deeds, W. E. (1968) Analytical Solutions to Eddy-Current Probe-Coil Problems. *J. Appl. Phys.* 39, 2929.
14. Stawicki K., Gratkowski S., Chady T., Komorowski M., Choice of frequency in eddy current testing of tubes (2003). *XII International Symposium on Theoretical Electrical Engineering, ISTET '03, Conference Proceedings*, J. (Eds.), Volume II, Warszawa, Poland.

What is claimed is:

1. An integrated in-situ sensor device for sensing characteristics of a multi-layer structure during operation thereof, the device comprising:
    a mechanical coupler to couple layers of the multi-layer structure together via an opening traversing the multi-layer structure; and
    a sensor circuit to
        insert into the opening with the mechanical coupler,
        induce an electrical response in a portion of the multi-layer structure adjacent the opening, the electrical response being indicative of characteristics of the multi-layer structure, and
        sense the induced electrical response to provide a signal characterizing the multi-layer structure.
2. The device of claim 1, wherein the mechanical coupler includes at least one of a bolt, stud, screw, latch or fastener.
3. The device of claim 1, further including a conformable film that is coupled to the mechanical coupler, the sensor circuit being manifested in the conformable film.
4. The device of claim 1, further including a coated layer deposited on the surface of the mechanical coupler, the sensor circuit being manifested in the coated layer.
5. The device of claim 1, further including a sleeve to couple the sensor circuit around and to the mechanical coupler and to insert into the opening with the mechanical coupler.
6. The device of claim 1, wherein the sensor circuit includes
    an active conductor to induce the electrical response, and
    a passive conductor to sense the induced electrical response.
7. The device of claim 1, wherein the sensor circuit includes
    an active conductor to induce the electrical response,
    a passive conductor to sense the induced electrical response,
    the active and passive conductors being wound around an outer diameter of the mechanical coupler to form an alternating winding pattern of active and passive conductor lines.
8. The device of claim 1, wherein the sensor circuit is integrated into the mechanical coupler.
9. The device of claim 1, wherein the sensor circuit is on an outer surface of the mechanical coupler.
10. The device of claim 1, wherein the sensor circuit is coupled to the mechanical coupler and adapted for insertion into the opening and between the mechanical coupler and a sidewall of the multi-layer structure that defines the opening.
11. The device of claim 1, wherein the sensor circuit is adapted to induce an electrical response in an underlying layer of a multi-layer structure having layers including upper and lower layers respectively above and below the underlying layer during lift-off conditions involving a separation between the underlying layer and the sensor circuit under operating conditions of the multi-layer structure.
12. The device of claim 1, wherein the sensor circuit induces an eddy current in the portion of the multi-layer structure adjacent the opening, and senses the induced eddy current to provide an indication of damage in the structure.
13. The device of claim 1, wherein the sensor circuit is adapted to induce an electrical response indicative of at least one of a mechanical and corrosive failure in the multi-layer structure.
14. The device of claim 1, wherein the sensor circuit induces an electrical response in material within the multi-layer structure that is located between opposing exposed surface layers that are held together by the mechanical coupler.
15. A system for detecting characteristics of a multi-layer structure, the system comprising:
    a fastener arrangement to insert into an opening traversing a multi-layer structure and to fasten layers in the multi-layer structure together, the fastener arrangement including
        an active electrical conductor to induce an electrical response by a target portion of the multi-layer structure that is at or below an exposed surface of the structure and along a sidewall defining the opening, and
        a passive electrical conductor to sense the induced electrical response from the target portion of the multi-layer structure;
    a controller coupled to control the active electrical conductor for applying the electric field; and
    a processor coupled to receive a signal corresponding to the sensed induced electrical response from the passive electrical conductor and to process the signal for detecting a characteristic of the target portion of the multi-layer structure.
16. The system of claim 15, wherein the fastener arrangement includes a fastener to fasten the layers in the multi-layer structure together and a conformable film to couple the active and passive electrical conductors to the fastener.
17. The system of claim 15, wherein the fastener arrangement includes a fastener to fasten the layers in the multi-layer structure together and a coated layer deposited on the surface of the fastener, the coated layer including the active and passive electrical conductors.

18. The system of claim 15, wherein the fastener arrangement includes a fastener to fasten the layers in the multi-layer structure together and a sleeve to couple the active and passive electrical conductors to the fastener.

19. The system of claim 15, wherein the active and passive electrical conductors are arranged to form an alternating winding pattern of active and passive conductor lines.

20. A method for sensing characteristics of a multi-layer structure during operation thereof, the method comprising:
   coupling layers of the multi-layer structure together by inserting a fastener into an opening traversing the multi-layer structure;
   inserting, with the fastener, a sensor circuit into the opening;
   using the sensor circuit,
      inducing an electrical response in a portion of the multi-layer structure adjacent the opening, the electrical response being indicative of characteristics of the multi-layer structure, and
      sensing the induced electrical response and providing a signal characterizing characteristics of the multi-layer structure.

21. The method of claim 20, wherein the step of inserting includes using a conformable film to couple the active and passive electrical conductors to the fastener.

22. The method of claim 20, wherein the step of inserting includes depositing a coated layer deposited on the surface of the fastener, the coated layer including the active and passive electrical conductors.

23. The method of claim 20, wherein the step of inserting includes using a sleeve coupled around a shank of the fastener to couple the active and passive electrical conductors to the fastener.

24. The method of claim 20, wherein the step of inserting includes arranging the active and passive electrical conductors to form an alternating winding pattern of active and passive conductor lines.

25. An integrated in-situ sensor device for sensing characteristics of a fastener during operation thereof, the device comprising:
   a fastener to couple layers of a multi-layer structure together via an opening traversing the multi-layer structure; and
   a sensor circuit to
      insert into the opening with the fastener,
      induce an electrical response in a portion of the fastener, the electrical response being indicative of characteristics of the fastener, and
      sense the induced electrical response to provide a signal characterizing the fastener.

26. The device of claim 25, further including a conformable film to couple active and passive electrical conductors of the sensor circuit to the fastener.

27. The device of claim 25, further including a coated layer deposited on the surface of the fastener, the coated layer including active and passive electrical conductors of the sensor circuit.

28. The device of claim 25, further including a sleeve coupled around a shank of the fastener to couple active and passive electrical conductors of the sensor circuit to the fastener.

29. The device of claim 25, wherein the sensor circuit includes active and passive electrical conductors that form an alternating winding pattern of active and passive conductor lines to respectively induce the electrical response and to sense the induced response.

30. An integrated in-situ sensor device for sensing characteristics of a fastener during operation thereof, the device comprising:
   a fastener to couple layers of a multi-layer structure together via an opening traversing the multi-layer structure; and
   a sensor circuit to
      insert into the opening with the fastener, and
      produce a measurable response characterizing a force provided by the fastener to couple layers of the multi-layer structure together.

31. The device of claim 30, further including a conformable film to couple active and passive electrical conductors of the sensor circuit to the fastener.

32. The device of claim 30, further including a coated layer deposited on the surface of the fastener, the coated layer including active and passive electrical conductors of the sensor circuit.

33. The device of claim 30, further including a sleeve coupled around a shank of the fastener to couple active and passive electrical conductors of the sensor circuit to the fastener.

34. A corrosion detection arrangement to detect a degree of corrosion in a battery, the arrangement comprising:
   an active electrical conductor to induce an electrical response by a target portion within the battery, and
   a passive electrical conductor to sense the induced electrical response from the target portion of the battery;
   a controller coupled to control the active electrical conductor for applying the electric field; and
   a processor coupled to receive a signal corresponding to the sensed induced electrical response from the passive electrical conductor and to process the signal for detecting a characteristic of the target portion of the battery.

35. The arrangement of claim 34, wherein the active and passive electrical conductors are included with a sleeve that fits around a target battery cell to detect conditions of corrosion of the battery cell.

* * * * *